United States Patent
Telnack

(10) Patent No.: US 9,505,449 B2
(45) Date of Patent: Nov. 29, 2016

(54) APPARATUSES, ASSEMBLIES, AND METHODS FOR DRAG REDUCTION OF LAND VEHICLES

(71) Applicant: Aerovolution Corporation, Olympia, WA (US)

(72) Inventor: Lee Joseph Telnack, Olympia, WA (US)

(73) Assignee: Aerovolution Corporation, Olympia, WA (US)

( * ) Notice: Subject to any disclaimer, the term of this patent is extended or adjusted under 35 U.S.C. 154(b) by 0 days.

(21) Appl. No.: 14/408,922

(22) PCT Filed: Jul. 19, 2013

(86) PCT No.: PCT/US2013/046637
§ 371 (c)(1),
(2) Date: Dec. 17, 2014

(87) PCT Pub. No.: WO2013/192338
PCT Pub. Date: Dec. 27, 2013

(65) Prior Publication Data
US 2015/0274220 A1   Oct. 1, 2015

Related U.S. Application Data

(60) Provisional application No. 61/661,727, filed on Jun. 19, 2012.

(51) Int. Cl.
*B60J 9/00* (2006.01)
*B62D 35/00* (2006.01)

(52) U.S. Cl.
CPC .................................. *B62D 35/001* (2013.01)

(58) Field of Classification Search
CPC ... A47B 47/042; E06B 3/7001; F16B 12/26; H02B 1/01; A01K 1/033; C04B 30/00; C08K 3/08; Y02E 10/44; A47F 3/005; B23P 19/062

USPC .................................. 296/180.4, 180.1, 191
See application file for complete search history.

(56) References Cited

U.S. PATENT DOCUMENTS

| 2,737,411 | A | * | 3/1956 | Potter | B62D 35/004 244/130 |
| 3,424,222 | A | * | 1/1969 | Caulkins | B60P 1/003 160/201 |

(Continued)

FOREIGN PATENT DOCUMENTS

| CA | 2405754 C | 10/2005 |
| WO | 2009102695 A2 | 8/2009 |
| WO | 2014210360 A1 | 12/2014 |

OTHER PUBLICATIONS

International Search Report and Written Opinion for PCT/US2013/046637 mailed Jun. 19, 2013.

*Primary Examiner* — Kiran B Patel
(74) *Attorney, Agent, or Firm* — Dorsey & Whitney LLP

(57) ABSTRACT

Examples of drag reduction apparatuses and assemblies for land vehicles, and particularly for attachment to a roll-up door of a land vehicle, are described. A drag reduction apparatus may include a plurality of panels foldably coupled together and automatically deployable into an unfolded configuration in which the panels define a cavity therebetween. The panels may be made from a semi-rigid material so that the panels generally conform to a roll-up door when the door is rolled up and/or down. The apparatus may be attached to the roll-up door using any of a variety of attachment mechanisms, for example a slidable keder-type device and/or one or more spring-loaded members.

14 Claims, 16 Drawing Sheets

(56) References Cited

U.S. PATENT DOCUMENTS

| | | | | |
|---|---|---|---|---|
| 3,814,472 | A | 6/1974 | Zelikovitz | |
| 4,006,932 | A | 2/1977 | McDonald | |
| 4,036,519 | A | 7/1977 | Servais et al. | |
| 4,142,755 | A * | 3/1979 | Keedy | B62D 35/001 296/180.2 |
| 4,236,745 | A | 12/1980 | Davis | |
| 4,257,641 | A * | 3/1981 | Keedy | B62D 35/001 296/180.4 |
| 4,401,338 | A | 8/1983 | Caldwell | |
| 4,458,936 | A * | 7/1984 | Mulholland | B62D 35/001 296/180.4 |
| 4,508,380 | A | 4/1985 | Sankrithi | |
| 4,553,781 | A | 11/1985 | Johnson | |
| 4,601,508 | A * | 7/1986 | Kerian | B62D 35/004 180/119 |
| 4,702,509 | A * | 10/1987 | Elliott, Sr. | B62D 35/004 137/523 |
| 4,741,569 | A | 5/1988 | Sutphen | |
| 4,978,162 | A * | 12/1990 | Labbe | B62D 35/004 296/180.2 |
| 5,058,945 | A | 10/1991 | Elliott, Sr. et al. | |
| 5,094,497 | A | 3/1992 | Hartung et al. | |
| 5,163,494 | A * | 11/1992 | MacNeil | E06B 3/928 160/188 |
| 5,236,347 | A | 8/1993 | Andrus | |
| 5,332,280 | A * | 7/1994 | DuPont | B62D 35/002 296/180.1 |
| 5,498,059 | A * | 3/1996 | Switlik | B62D 35/001 296/180.1 |
| 5,782,521 | A | 7/1998 | Anderson | |
| 5,823,610 | A | 10/1998 | Ryan et al. | |
| 5,947,548 | A * | 9/1999 | Carper | B62D 35/001 296/180.1 |
| 6,017,082 | A | 1/2000 | Leoni | |
| 6,092,861 | A * | 7/2000 | Whelan | B62D 35/001 296/180.2 |
| 6,119,307 | A * | 9/2000 | Weishar | E06B 3/485 16/106 |
| 6,257,654 | B1 * | 7/2001 | Boivin | B62D 35/001 296/180.4 |
| 6,309,010 | B1 * | 10/2001 | Whitten | B62D 35/001 296/180.1 |
| 6,409,252 | B1 * | 6/2002 | Andrus | B62D 35/004 296/180.1 |
| 6,457,766 | B1 | 10/2002 | Telnack | |
| 6,467,833 | B1 * | 10/2002 | Travers | B62D 35/004 296/180.1 |
| 6,485,087 | B1 | 11/2002 | Roberge et al. | |
| 6,666,498 | B1 * | 12/2003 | Whitten | B62D 35/004 296/180.1 |
| 6,799,791 | B2 * | 10/2004 | Reiman | B62D 35/004 296/180.1 |
| 7,008,004 | B2 * | 3/2006 | Ortega | B62D 35/004 105/1.1 |
| 7,618,086 | B2 | 11/2009 | Breidenbach | |
| 7,837,254 | B2 * | 11/2010 | Reiman | B62D 35/001 296/180.4 |
| 7,854,468 | B2 | 12/2010 | Vogel et al. | |
| 8,025,329 | B1 * | 9/2011 | Kron | B62D 35/001 296/180.1 |
| 8,079,634 | B2 * | 12/2011 | Visser | B62D 35/004 296/180.1 |
| 8,100,461 | B2 | 1/2012 | Smith et al. | |
| 8,177,287 | B2 | 5/2012 | Vogel et al. | |
| 8,287,030 | B2 * | 10/2012 | Ryan | B62D 35/004 296/180.4 |
| 8,360,509 | B2 | 1/2013 | Smith et al. | |
| 8,414,064 | B2 * | 4/2013 | Litchfield | B62D 35/001 296/180.1 |
| 8,444,210 | B2 | 5/2013 | Domo et al. | |
| 8,579,360 | B2 * | 11/2013 | Litchfield | G06F 12/0246 296/180.1 |
| 8,672,391 | B1 * | 3/2014 | Cobb | B62D 35/001 296/180.4 |
| 8,851,554 | B2 * | 10/2014 | Wayburn | B62D 35/004 296/180.1 |
| 8,893,764 | B2 * | 11/2014 | Mascari | E05D 15/165 16/82 |
| 9,051,013 | B1 * | 6/2015 | Popa | B62D 35/004 |
| 2002/0030384 | A1 * | 3/2002 | Basford | B62D 35/001 296/180.1 |
| 2004/0119319 | A1 | 6/2004 | Reiman et al. | |
| 2006/0273625 | A1 * | 12/2006 | Andrus | B62D 35/004 296/180.1 |
| 2007/0001481 | A1 * | 1/2007 | Breidenbach | B62D 35/001 296/180.1 |
| 2007/0126261 | A1 * | 6/2007 | Breidenbach | B62D 35/001 296/180.1 |
| 2008/0048468 | A1 * | 2/2008 | Holubar | B62D 35/001 296/180.4 |
| 2008/0061598 | A1 * | 3/2008 | Reiman | B62D 35/001 296/180.4 |
| 2008/0116716 | A1 * | 5/2008 | O'Grady | B62D 35/001 296/180.4 |
| 2008/0164722 | A1 * | 7/2008 | Breidenbach | B62D 35/001 296/180.1 |
| 2008/0309122 | A1 * | 12/2008 | Smith | B62D 35/001 296/180.1 |
| 2009/0096250 | A1 * | 4/2009 | Kohls | B62D 35/001 296/180.4 |
| 2009/0179456 | A1 * | 7/2009 | Holubar | B62D 35/001 296/180.4 |
| 2009/0200834 | A1 * | 8/2009 | Vogel | B62D 35/001 296/180.3 |
| 2010/0225143 | A1 | 9/2010 | Skopic | |
| 2011/0037291 | A1 * | 2/2011 | Pickering | B62D 35/001 296/180.4 |
| 2011/0068603 | A1 * | 3/2011 | Domo | B62D 35/001 296/180.1 |
| 2011/0084516 | A1 * | 4/2011 | Smith | B62D 35/001 296/180.4 |
| 2011/0221231 | A1 | 9/2011 | Visser et al. | |
| 2013/0106136 | A1 * | 5/2013 | Smith | B62D 35/001 296/180.4 |
| 2014/0117713 | A1 | 5/2014 | Baker | |
| 2014/0367993 | A1 * | 12/2014 | Breidenbach | B62D 35/001 296/180.4 |
| 2015/0035312 | A1 | 2/2015 | Grandominico et al. | |
| 2015/0329152 | A1 | 11/2015 | Baker et al. | |
| 2016/0009322 | A1 | 1/2016 | Telnack | |

* cited by examiner

APPARATUSES, ASSEMBLIES, AND METHODS FOR DRAG REDUCTION OF LAND VEHICLES

CROSS-REFERENCE

This application is a national stage entry of International Application No. PCT/US2013/046637 filed Jun. 19, 2013, which claims the benefit of U.S. Provisional Patent Application Ser. No. 61/661,727, filed Jun. 19, 2012, which are incorporated herein by this reference in their entirety for any purpose.

TECHNICAL FIELD

The present disclosure relates methods and apparatuses for drag reduction of land vehicles, such as trucks, tractor trailers and similar vehicles, including examples of a drag reduction apparatus for attachment to a roll-up door of a land vehicle.

BACKGROUND

The present disclosure relates to drag reduction for land vehicles, such as trucks, tractor-trailer rigs, buses, recreational vehicles, and the like. Drag generated by a vehicle may be proportional to the surface area of the vehicle, and such larger land vehicles may be particularly concerned with reducing drag in order to reduce fuel consumption. While certain drag reduction devices for land vehicles are known, devices of this kind may have limitations and may not be suited for all applications. For example, known drag reduction devices are typically designed to attach to the frame of a truck cargo door. As such, the drag reduction device must be pulled to the side of the truck body and/or swung open in order to access the cargo door. This may be cumbersome as it may add extra steps before an operator can reach the cargo. This may be particularly disadvantageous for freight or other shipping operators who may be operating under tight schedules. More over such conventional drag reduction devices may not be suited for use as gap fillers. Alternate and/or improved devices for drag reduction may be desirable.

SUMMARY

Examples of apparatuses, systems and methods for drag reduction of land vehicles, such as trucks, tractor trailers, and similar vehicles, are described, including examples of drag reduction apparatus for attachment to a roll-up door of a land vehicle. An apparatus for drag reduction according to one example may include a plurality of panels including a top panel, a bottom panel, a first and second side panels, and a plurality of transition panels connecting the top, bottom and side panels, and an attachment mechanism disposed along a side edge of the first and/or second side panels and configured to pivotally and slidably secure the plurality of panels to a surface. The plurality of panels may be foldably coupled to allow the panels to be provided between a folded configuration in which the panels are substantially flat against each other and a deployed configuration in which the panels cavity therebetween. The panels may be made from a semi-rigid material such that the apparatus is bendable about at least one axis when the panels are in the folded configuration. The apparatus may further comprise at least one foldable joint disposed at adjacent edges of one or more of the plurality of panels, the foldable joint including a multi-layer structure secured to either or both sides of the panels such that a gap remains between layers of the multi-layer structure. In some examples, at least one layer of the multi-layer structure may be made from a flexible material, for example flexible and/or extruded plastic. The apparatus may further include a back cover, and the top panel, the bottom panel, and the first and second side panels may each be foldably attached to the back cover.

In some examples, the attachment mechanism may be a keder-type device including a keder bead attached to one of the first or second side panels, the keder-type device further including a keder rail configured for attachment to a roll-up door of a truck. The attachment mechanism may be one of a plurality of attachment mechanisms disposed along a first edge of the first side panel and along a second edge of the second side panel. In some examples, the surface to which the apparatus is attached may be a face of a roll-up door of a vehicle, and the attachment mechanism may include a first portion configured to be fixedly attached to an individual door panel, the attachment mechanism further including a second portion which may be attached to the first side panel or the second side panel, the second portion slidably coupled to the first portion.

An apparatus according to some examples of the present disclosure may include a folded structure of semi-rigid material, the folded structure comprising four panels and a backing sheet, each of the four panels attached to the backing sheet along a perimeter of the backing sheet, each of the four panels attached to two other ones of the four panels using a transition panel such that the four panels and the transition panels define a cavity when the four panels and the transition panel are unfolded away from the backing sheet. In some examples, the four panels of the apparatus may include a top panel, a bottom panel, and two side panels, and the top and bottom panels may be disposed between the side panels and the backing sheet when four panels are folded towards the backing sheet. In other examples, the four panels of the apparatus may include a top panel, a bottom panel, and two side panels, and the top panel may be disposed over the side panels when four panels are folded towards the backing sheet. The backing sheet may be interchangeably referred to herein as back panel or back cover. The apparatus may further comprise a living hinge between respective ones of the four panels and transition panels adjacent to the respective ones of the four panels. The living hinge may include one or more welded joints.

A system for drag reduction according to the present disclosure may include a roll-up door of a truck, the roll-up door including a plurality of door panels, pairs of adjacent door panels pivotable at an interface between the adjacent door panels, and an apparatus, for example any of the apparatuses for drag reduction described herein. In some embodiments, the apparatus may include a plurality of panels made from a semi-rigid material, and the apparatus may be attached to the roll-up door such that at least one panel spans a plurality of adjacent door panels. The plurality of panels of the apparatus may include four main panels and four transition panels, and the apparatus may further include a living hinge between each of the four main panels and respective adjacent ones of the transition panels. The apparatus may be automatically deployable to an unfolded configuration responsive to a low pressure region at the rear of the truck. The truck may include a pair of cables, each disposed along a side of the roll-up door, and the plurality of panels of the apparatus may be disposed between the pair of cables. The system may further include a span guide extending between a header of the roll-up door and a roof line of the truck, and the span guide may be configured to deflect at least a portion of the apparatus away from a roller member of the roll-up door during opening and/or closing of the roll-up door. The system may further include one or more attachment mechanisms, each including a first member and a second member, the first member attached to an individual door panel and the second member attached to the apparatus along an edge of the apparatus, the second member slidably engaged with the first member. The system may further include a retention mechanism configured to prevent hyper-extension of one or more of the plurality of panels.

BRIEF DESCRIPTION OF THE DRAWINGS

A brief description of the drawings is provided below to facilitate understanding of the present disclosure. These drawings depict only several examples in accordance with the disclosure and are, therefore, not to be considered limiting of its scope. The disclosure will be described with additional specificity and detail through use of the accompanying drawings, in which.

DESCRIPTION

Figure 1:
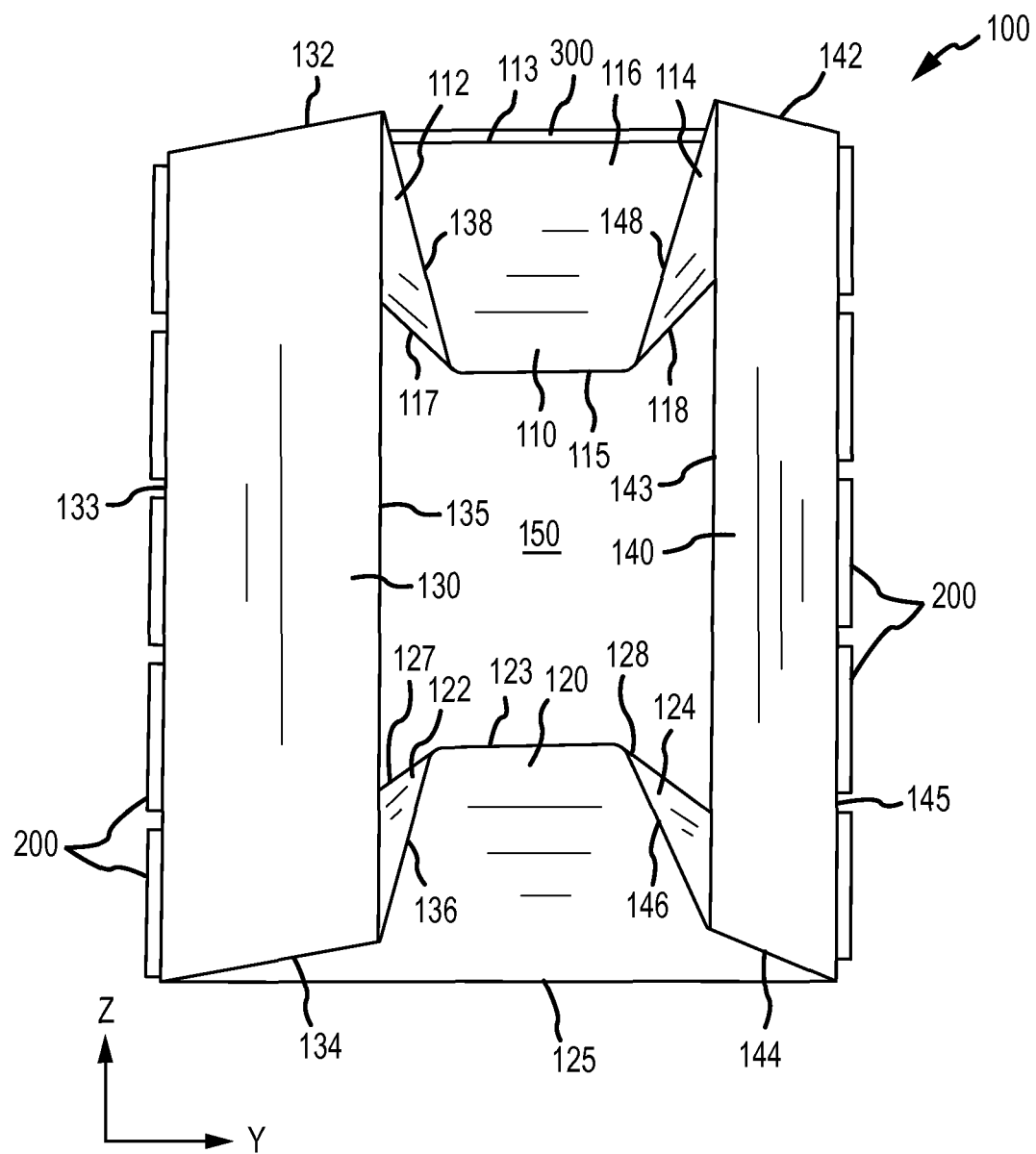
FIG. 1 is a front view of an apparatus for drag reduction according to the present disclosure.

In the following detailed description, reference is made to the accompanying drawings, which form a part hereof. In the drawings, similar symbols typically identify similar components, unless context dictates otherwise. The illustrative examples described in the detailed description and drawings are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are implicitly contemplated.

Figure 6:
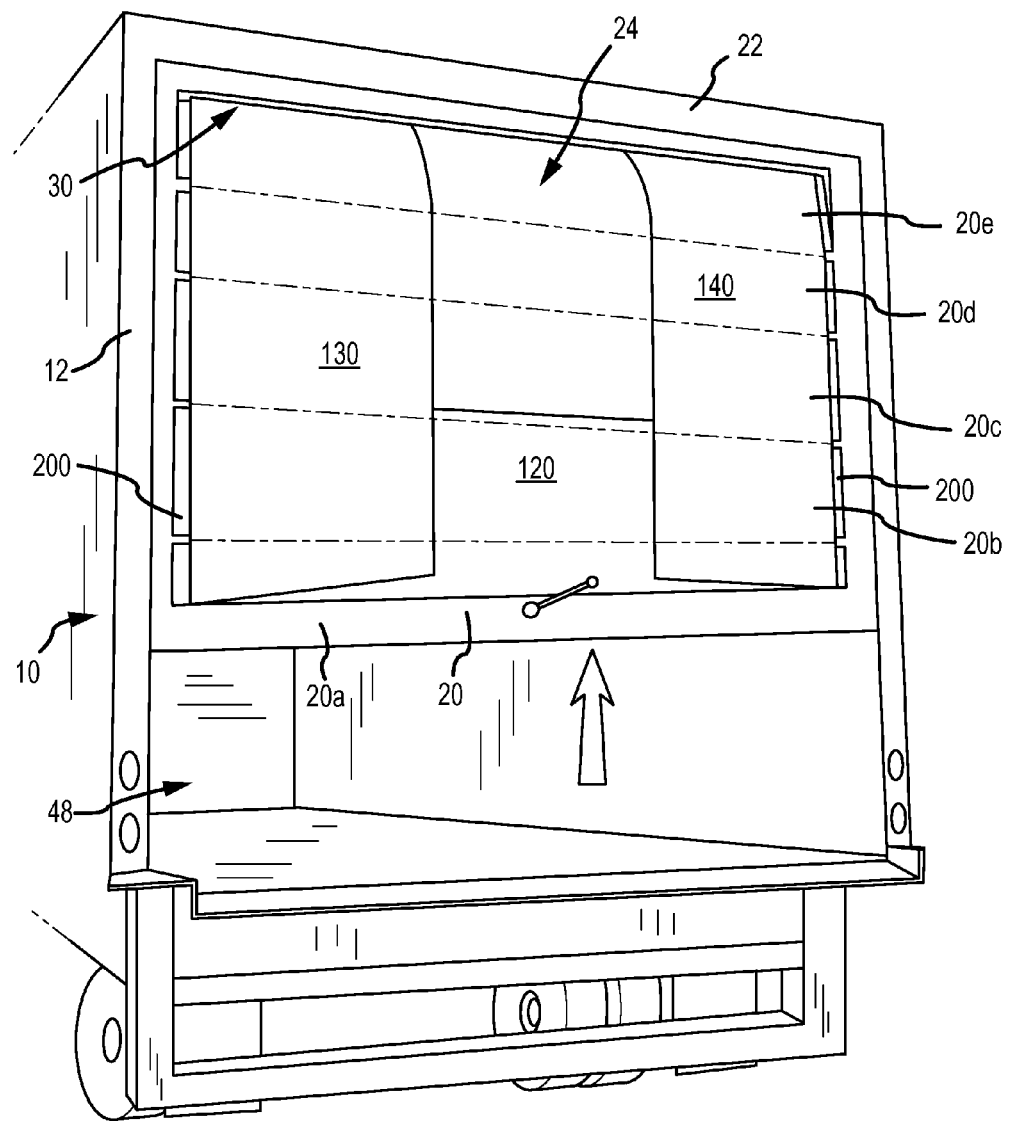
FIG. 6 is an illustration of the apparatus in FIG. 5 with the cargo door in a partially open position.
Figure 8:
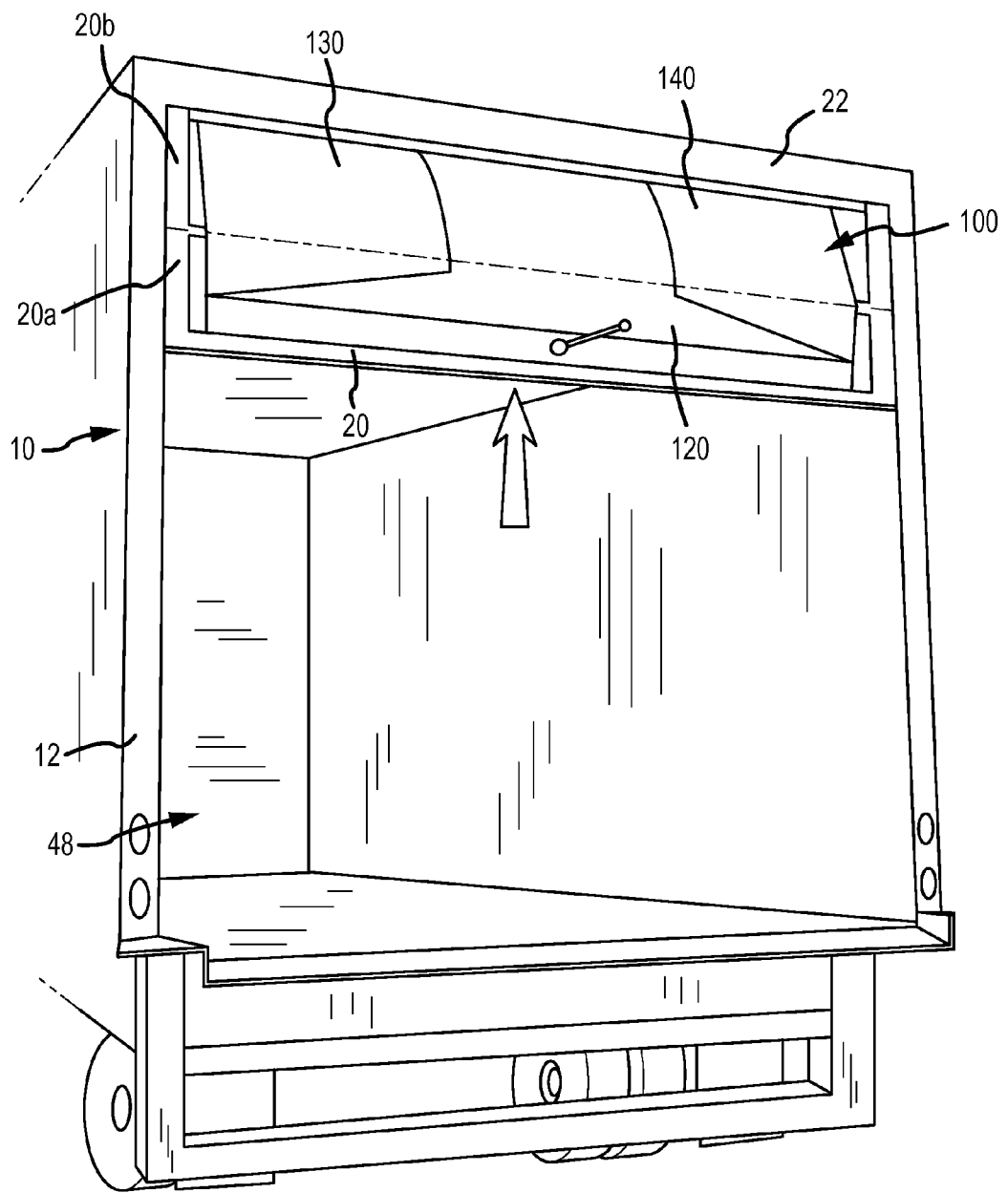
FIG. 8 is an illustration of the apparatus in FIG. 3 with the cargo door in an alternate partially open position.
Figure 10A:
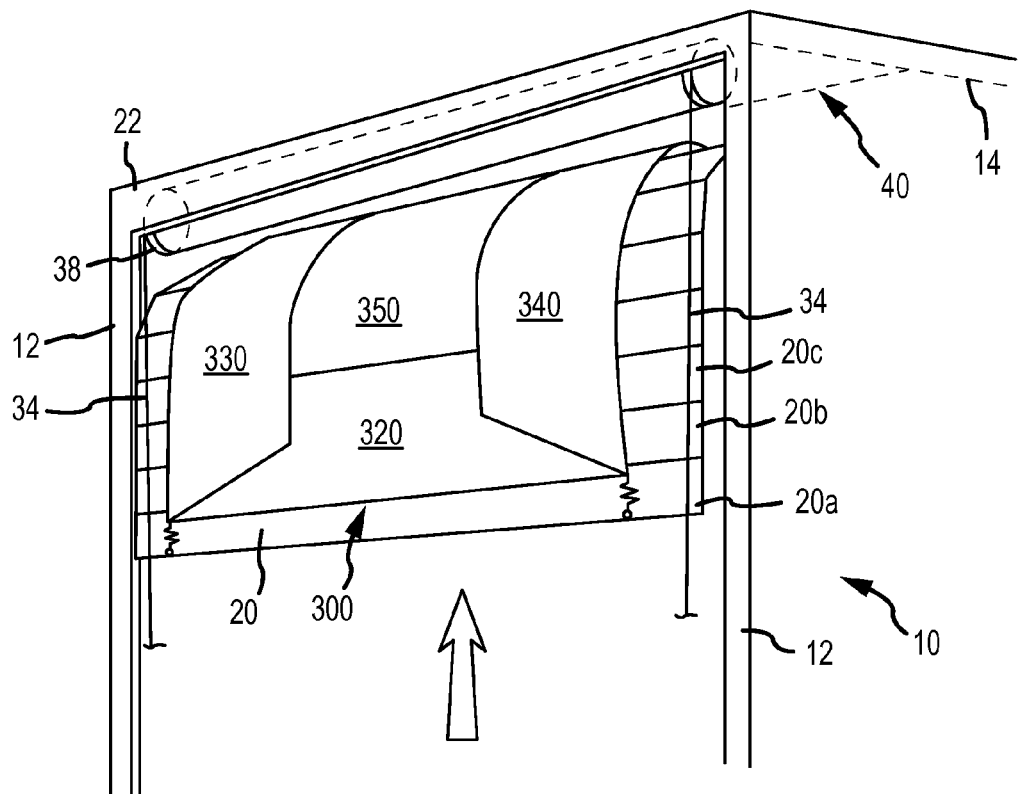
FIGS. 10A-10B are simplified partial isometric and plan views of an assembly according to the present disclosure.

The present disclosure relates to improved drag reduction apparatuses and assemblies for land vehicles, and particularly for attachment to a roll-up door of a land vehicle. Apparatuses according to the examples herein may be described as "gap tail crossover" apparatuses as they may be utilized for both gap fill and drag reduction at the tail of the vehicle. Furthermore, the apparatuses described herein may be well suited for efficient and interchangeable use as gap filler or as tail drag reduction apparatuses in situations in which the position of the land vehicle may be varied. The drag reduction apparatuses according to the present disclosure may be configured to be generally self-deploying in that it is configured to expand to its unfolded state by the air pressure profile (e.g. suction forces) typically exhibited at the rear portion of the vehicle when the vehicle speed increases. As such, the apparatus may further be described as and may be interchangeably referred to herein as a "ventilated cavity" type apparatus. The apparatus may include a plurality of panels, as will be further described, and one or more attachment mechanisms for securing the apparatus to a door of a land vehicle (e.g., roll-up cargo door). The panels may be configured such that they maintain their shape and do not flex or sag while in a deployed or any stage of a partially deployed configuration, e.g., FIGS. 4, and 14). The panels may be further configured to generally conform to the shape of the cargo door as the door is operated (e.g. opened or rolled-up and closed or rolled-down), e.g., as shown in FIGS. 6, 8, and 10A. In some examples, each of the plurality of panels of the apparatus may be made of a semi-rigid material configured to have sufficient rigidity to maintain aerodynamic stability when deployed, but also having sufficient flexibility to flex and articulate with the door. The one or more attachment mechanisms may be configured for securing the apparatus to the door in a manner which does not interfere with the operation of the door, as will be further described.

FIG. 1 shows an apparatus according to a first embodiment of the present disclosure. The apparatus 100, includes a top panel 110, a bottom panel 120, a first side panel 130 (also referred to herein as left panel 130), and a second side panel 140 (also referred to herein as right panel 140). The panels may be foldably coupled together to allow the panels to be provided between a first or folded configuration and a second or deployed configuration. In the folded configuration (e.g., see FIG. 5), the panels lie substantially flat against each other. When the apparatus is attached to a land vehicle (e.g. the cargo door 20 of a truck 10 as shown in FIG. 5), the panels lie substantially flat against the cargo door. In a deployed or partially deployed configuration (e.g., see FIG. 4), the panels are unfolded or disposed away from the cargo door 20 to define a cavity 150 therebetween. The apparatus 100 is configured such that it does not block access to the cargo door 20 when mounted thereto. The apparatus 100 may further include one or more attachment mechanisms (e.g., 200) for securing the apparatus 100 to the land vehicle. In some examples, the one or more attachment mechanisms may be arranged at the corners and/or around at least a portion of the perimeter of the apparatus 100, for example along the side edges 133, 145.

The panels may be sized such that the apparatus 100 spans a substantial portion of the face of the cargo door when attached thereto. The left and right panels 130, 140, respectively, may be generally rectangular or slightly trapezoidal in shape. The left and right panels may have first and second sides or edges 133, 135 and 143, 145, respectively, and top and bottom sides or edges 132, 142 and 134, 144, respectively. The side panels (e.g., left and right panels 130 and 140) may be sized to extend substantially the full vertical length (e.g., along the z-direction) of a cargo door 20 (as shown in FIG. 5, for example). The top and bottom panels, 110 and 120 respectively, may be generally trapezoidal in shape and may have top and bottom sides or edges 113, 123 and 115, 125, respectively. The apparatus 100 may further include transition panels configured to bridge the gap between adjacent panels. The apparatus 100 includes first and second top transition panels, 112 and 114 respectively, also referred to as top left transition panel 112 and top right transition panel 114. The apparatus 100 further includes first and second bottom transition panels, 122 and 124 respectively, also referred to as bottom left transition panel 122 and bottom right transition panel 124. Each transition panels may be generally triangular in shape and may be disposed between the side and top panels and the side and bottom panels in the folded configuration. When unfolded, each pair of transition panels (e.g. the top transition panels and the bottom transition panels) combine with the respective top or bottom panel 110, 120 to define a generally rectangular or slightly trapezoidal surface area at the top and bottom in the unfolded configuration.

Figure 16:
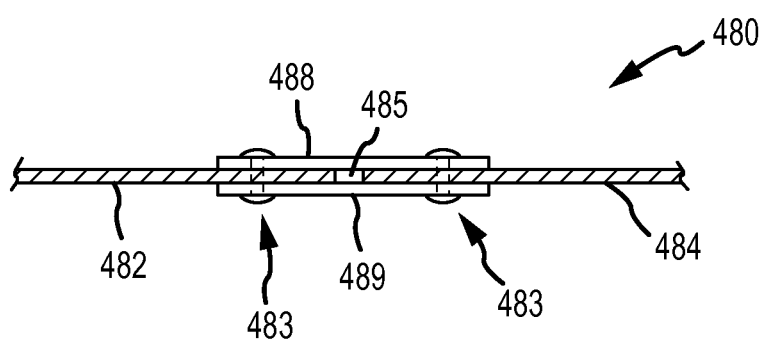
FIG. 16. is an illustration of a foldable joint according to the present disclosure.

In the example in FIG. 1, the first top transition panel 112 and the left panel 130 are foldably or hingedly connected at their adjacent or abutting edge 123, also referred to as first top fold line 132. The second top transition panel 114 and the right panel 140 are foldably or hingedly connected at their adjacent or abutting edge 142, also referred to as second top fold line 142. The first bottom transition panel 122 and the left panel 130 are foldably or hingedly connected at their adjacent or abutting edge 134, also referred to as first bottom fold line 134, and the second bottom transition panel 124 and the right panel 140 are foldably or hingedly connected at their adjacent or abutting edge 144, also referred to as second bottom fold line 144. In a similar manner, the first and second top transition panels 112, 114 are foldably or hingedly connected to the top panel 110 at edges 117, 118, respectively, also referred to herein as top diagonal fold lines 117, 118. The first and second bottom transition panels 122, 124 are foldably or hingedly connected to the bottom panel 130 at edges 127, 128, respectively, also referred to herein as bottom diagonal fold lines 127, 128. When the apparatus is provided in an unfolded configuration, adjacent panels are thus connected to define a side wall of a generally cuboid cavity 150, the wall extending between a continuous bottom perimeter defined by the edges or hinge lines 113, 145, 125 and 133 and top perimeter defined by the sides or edges 115, 143, 123, and 135. The top perimeter is generally unattached to any structure (e.g., free floating) such that the top perimeter can expand into the unfolded configuration when the apparatus is deployed. When the apparatus unfolds to the unfolded or deployed configuration, the top panel unfolds or moves upward at the hinge line 113, the bottom panel unfolds or moves downward at the hinge line 125, and the side panels 130, 140 unfold outward, e.g., to the left and right, respectively, about the hinge lines 133 and 145, respectively. A foldable joint (e.g., as shown in FIG. 16 and as will be further described) may be disposed along each of the fold lines 117, 118, 127, 128, 132, 134, 142, and 144, e.g., to facilitate unfolding of the apparatus with minimal resistance.

Each of the panels 110, 120, 130, 140, as well as the transition panels 112, 114, 122, and 124, may be made of a lightweight semi-rigid material, for example a polymer or composite material. In some examples, the panels may be formed using a fiber reinforced polypropylene or polyethylene (FRP) material and may have a thickness of about 0.05 to about 0.24 inches. In some examples, the panels may be made of foam which may be laminated on one or both sides. The foam may be polyethylene foam, and in examples, it may be laminated or faced using one or more layers for improved durability of the panels and/or for preventing damage to the core, such as by preventing intrusion of pollutants into the foam core. While not meant to be limiting, in some examples, the outer layers may be substantially made of any polymeric material, for example nylon, polyester, Mylar, or any other of a variety of durable polymeric materials. In some examples, the outer layers may be provided as a film or a woven layer of polymer or aramid fibers. Other materials may be used for the outer layers and/or core. In some examples, the panels may be mylar or nylon faced foam insulation panels may be up to about 0.25 inch thick, or in some examples, may have a thickness of up to about 0.5 inches. The panels, and depending on the materials selected, may have a different thickness, and the examples described herein are provided for illustration purposes and are not to be taken in a limiting sense. Essentially, any foam or other semi-rigid material may be used to provide a desired level of rigidity while allowing the panels to fold and articulate as will be further described. Generally, the panels may be made from any material that is sufficiently stiff or rigid to maintain their shape in the deployed state, while being sufficiently flexible and/or resilient to allow the panels to fold and conform to the shape of the cargo door when the cargo door is rolled up and/or down for accessing the cargo compartment of the truck.

In some examples, the side panels 130, 140 may be folded over the top and right panels 110, 120. In such examples, the side panels 130, 140 may be the exterior panels in the folded configuration with the top and bottom panels 110, 120 disposed between the cargo door and the side panels. In other examples, the side panels 130, 140 may be folded under the top and/or bottom panels, as will be described e.g., with reference to FIG. 12. In such examples, the top and/or bottom panels may be the exterior panels with the side panels disposed at least partially under the top and/or bottom panels (e.g., between the cargo door and the top and/or bottom panels) in the folded configuration.

As described, each of the side panels 130, 140, as well as the combined top and bottom panels (e.g., panels 112, 110, and 114, and panels 122, 120, and 124) may be generally rectangular or slightly trapezoidal in shape such that a generally cuboid or a tapered cuboid cavity 150 may be defined between the panels when the panels are unfolded in a deployed or partially deployed configuration. In some examples, the combined top and bottom panels may naturally tend to return to their pre-deployed position by virtue of the slightly tapered/trapezoidal combined shape of the combined top and bottom panels. Typically the top panel 110 may tend to fold back to its unfolded position first, in part due to gravity pulling the top panel 110 down when the speed of the vehicle decreases. As the top panel 110 folds down, the side panels 130, 140 may tend for fold inward, in part due to a pulling force applied by the transition panel 112, 114 which are attached to the top panel. That is, the transition panels 112, 114 may tend to pull the left and side panels 130, 140 by virtue of the connection along edges 132, 142 and the downward force exerted by the top panel 110 as the top panel folds down. As the side panels 130, 140 fold inward, the bottom panel 120 may be urged upward (e.g., towards its folded position) by virtue of a pushing force applied by the transition panels 122, 124. In some examples, a retention mechanism 160 (see FIG. 4) may be provide to prevent the bottom panel 120 and/or bottom transition panels 122, 124 from collapsing downward, e.g., due to gravity. The retention mechanism 160 may be one or more strings, cables, bungee cords, or other tension members, which may be anchored to the cargo door 20 at one end and connected along the edge(s) 123, 136, and/or 146 at their other end for preventing movement of these edges below a certain horizontal line. Additional retention mechanisms may be included, which may be attached to any of the panels (e.g., top and side panels 110, 130, 140) for minimizing or preventing hyperextension of the panels. For example, the retention mechanism may be configured to permit extension or unfolding of the panels to up to about 90 degrees relative to the cargo door. One or more retention mechanisms (e.g., cables or bungee cords) may be attached to each panel to limit movement of the panels to a 90 degree unfolded position.

As described, the apparatus (e.g., 100) may be attached to a surface at the rear of a land vehicle, e.g., for unfolding into a ventilated cavity and reducing drag. In contrast to drag reduction devices which may be currently known and which are typically attached to the frame of the vehicle (e.g. FIG. 12), the apparatuses according to the present examples may be configured for attachment directly to cargo door 20, which in some examples may be a roll-up door. Attaching the apparatus to a roll-up cargo door may present new challenges, for example due to the individually articulating panels of the cargo door. The attachment mechanism according to the present disclosure may address some or all of these challenges.

In the example in FIG. 1, the apparatus may be attached to the cargo door continuously or discontinuously, along one or more of its edges. For example, the apparatus 100 may be pivotally attached to the cargo door at its top edge (e.g., along the edge 113). By pivotal attachment it is implied that the panel (e.g., top panel 110) may be attached to the door in a manner which allows the panel to pivot in a first direction about the lateral axis (e.g., the y axis) to unfold into a deployed position, as well as pivot in the opposite direction about the lateral axis to fold to the undeployed position. The panels may be configured to pivot at least 90 degrees or more from their undeployed to the deployed position. In some examples, the panels may not need to pivot a full 90 degree to be in a deployed or partially deployed position for drag reduction. The top panel 110 may be attached to the door such that it remains otherwise secured against lateral movement.

The apparatus 100 may be pivotally and slidably attached along certain other portions of the perimeter of the apparatus, for examples along the side edges 133 and 145. This may allow the side panels 130, 140 to pivot about the vertical axis (e.g., the z-axis) to unfold during deployment and may further facilitate sliding of the side edges 133, 145 relative the surface of the cargo door (e.g., along the z-axis) during opening and closing of the door, as will be further described. The apparatus 100 may be pivotally and slidably attached to the cargo door using one or more attachment mechanisms 200, which may be a plurality of keder-type devices extending along at least a portion of the side edges 133, 145 of the apparatus 100. Other attachment mechanisms may be used, as will be described e.g., with reference to FIGS. 9 and 12.

Figure 2:
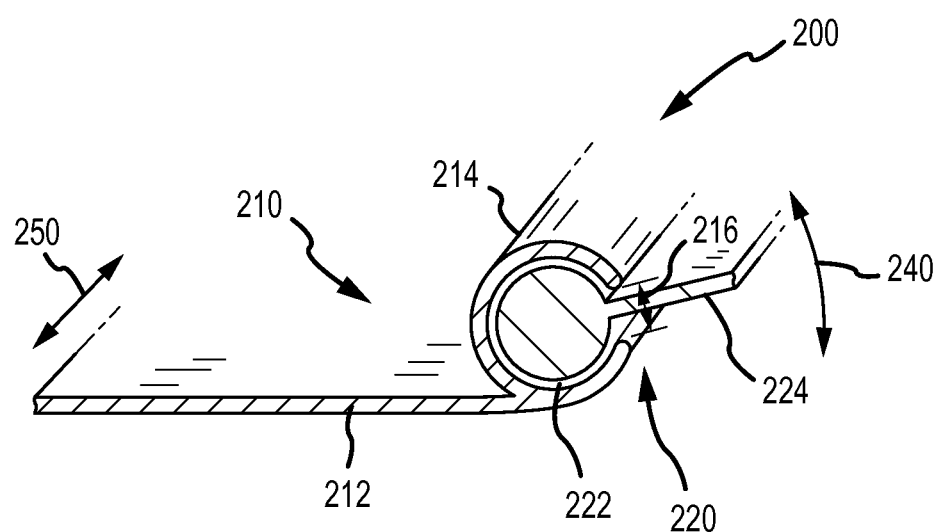
FIG. 2 is an illustration of an attachment mechanism of an apparatus for drag reduction according to the present disclosure.
Figure 7:
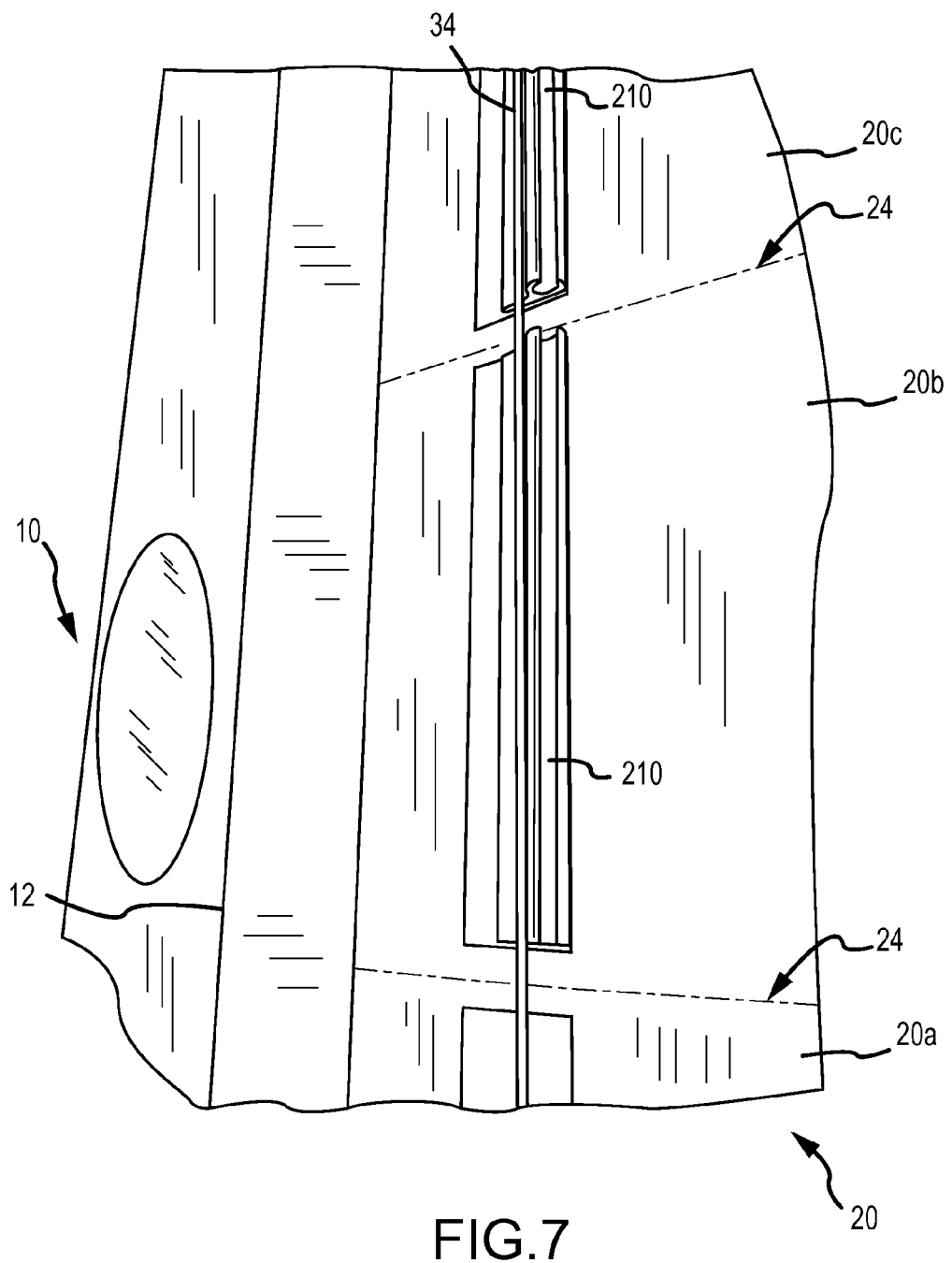
FIG. 7 is a partial view of an attachment mechanism of an apparatus according to the present disclosure, the attachment mechanism secured to a cargo door of a truck.

FIG. 2 shows an attachment mechanism for securing the apparatus to a land vehicle according to examples of the present disclosure. The attachment mechanism 200 may be a keder-type device. The attachment mechanism 200 may include a first member 210 (e.g., keder track or keder rail 210) and a second member 220 (e.g., keder bolt or keder bead 220). The first member 210 may be attached to the cargo door and the second member 220 may be attached to a panel (e.g., left and/or right panels 130, 140) of the apparatus 100. A plurality of attachment mechanisms 200 may be used along the vertical length of the cargo door and the length of the panels, e.g., the side edges 133, 145 of the left and right panels 130, 140, respectively (see e.g., FIGS. 1, and 3). The attachment mechanism 200 (e.g., keder-type device) may be attached to the roll-up door using any conventional fastening methods (e.g., bolting, welding, screwing, bonding or otherwise adhering the rail to the door). For example, and as shown in FIG. 7, individual ones of the keder tracks 210 may be secured to individual ones of the panels of the door 20a, 20b, 20c, etc. (see e.g., FIGS. 6-7).

The first member 210 may include a base portion 212, which may be a generally planar portion. The first member 210 may further include a rail or track portion 214, which is shaped for cooperating fit with the second member 220. The rail or track portion 214 of the first member 210 may be generally circular in cross-section and may include a slot along the length of the mechanism (e.g. along a direction indicated by arrow 250). The first member may be made from a resilient material (e.g., plastic). In some examples, the base portion and/or track portion may be made from high density polyurethane (HDPE), nylon, PC/ABS blend plastic, polyetheretherketone (PEEK), and other plastic materials. In some examples, the track portion may be made from a metallic material. The first member may be a unitary structure (e.g., the base and track portions may be integrally formed). In other examples, the base and track portions may be separate components jointed together to form the first member, and the base and/or track portions may be made from dissimilar materials.

The rail to track portion 214 may be configured to be pivotally and slidably coupled to the second portion (e.g., keder bolt 220). The second member 220 may include a bead portion 222 and a stem portion 224 attached to the bead portion. The rail or track portion 214 may have an inner cavity configured to receive the bead portion 222 in a manner which does not interfere with movement of the bead portion 222. When the bead portion 222 of the second member is inserted into the track portion 214 of the first member, the stem portion 224 extends through the slot of the track portion. The stem portion 224 may be free to rotate about a centerline the bead portion 222 (e.g., in a direction indicated by arrow 240). The width 216 of the slot may be greater than a thickness of the stem portion 224 such that the walls of rail portion 214 do not interfere with stem portion 224 when the second member 220 is pivoted within the first portion. In this manner, the second member 220 of the attachment mechanism may be pivotally engageable with the first member of the attachment mechanism. The second member 220 may also be slidable relative to the first member within the cavity of the rail portion (e.g., along the direction 250). In some examples, a low friction coating or lubricant may be disposed between the abutting surfaces of the rail portion and the bead portion to minimize resistance of movement and wear of the pivotable/slidable joint. In other examples, the track portion and the bead portion may be made from low friction materials.

In some examples, the width 216 of the slot may be only wide enough for the stem portion 224 to pass through but not sufficiently wide to permit rotation of the bead portion 222 relative to the track portion 214. In such examples, at least a portion of the first member 210 may be flexible to allow the track portion to move relative to the base portion along the direction 240. The base portion may be sufficiently bendable about the longitudinal axis of the mechanism to permit movement of the track portion. In other examples, a hinge or foldable joint may be included near the interface of the base and track portions 212, 214, such that the track portion may be pivotally joined to the base portion 212. In this regard, flexible and/or pivotal coupling between the panels of the apparatus and the cargo door may be achieved even if the second member is not configured to pivot relative to the first member.

Figure 3:
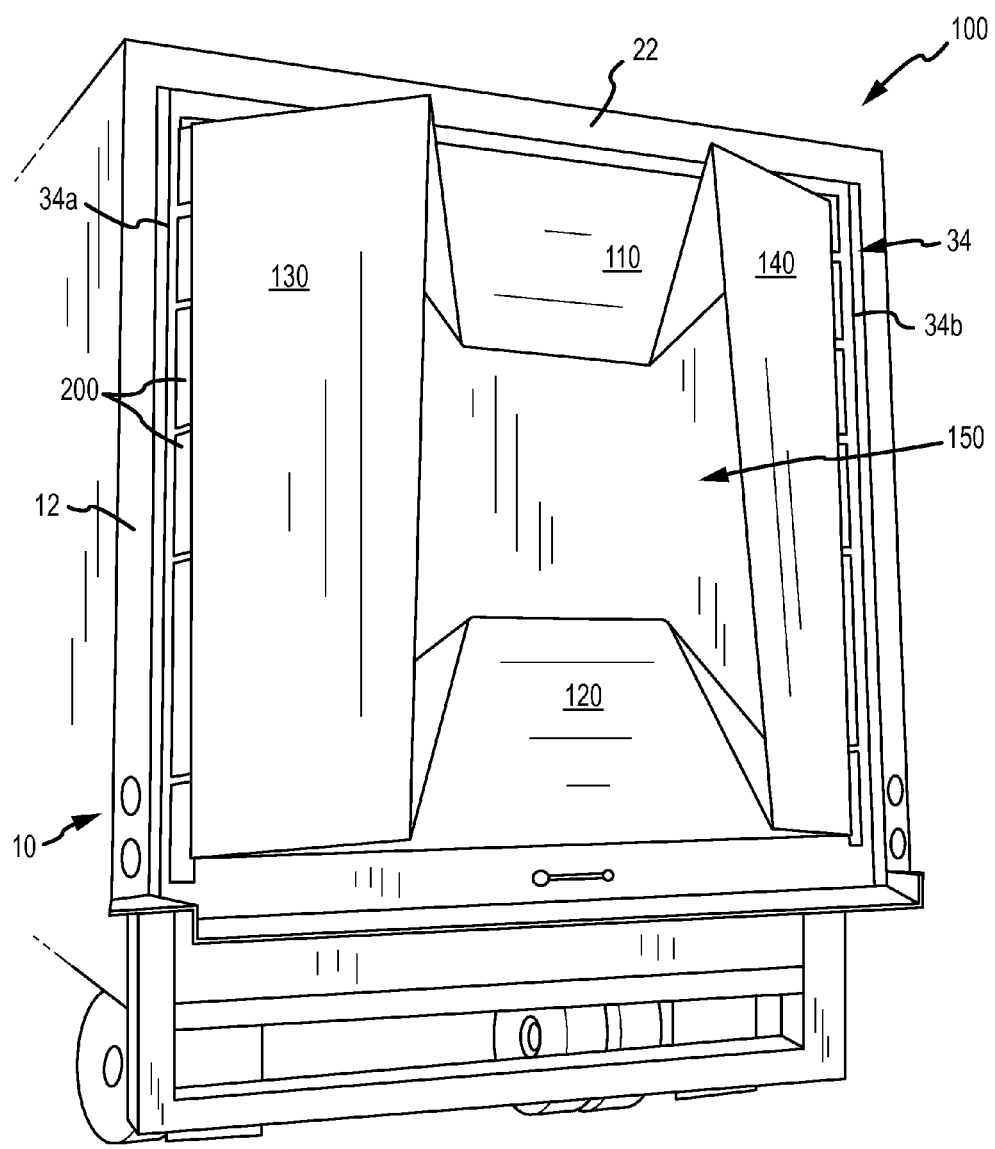
FIG. 3 is an illustration of an apparatus according to the present disclosure attached to a cargo door of a truck, the apparatus shown in a partially unfolded configuration at an early stage of deployment.
Figure 4:
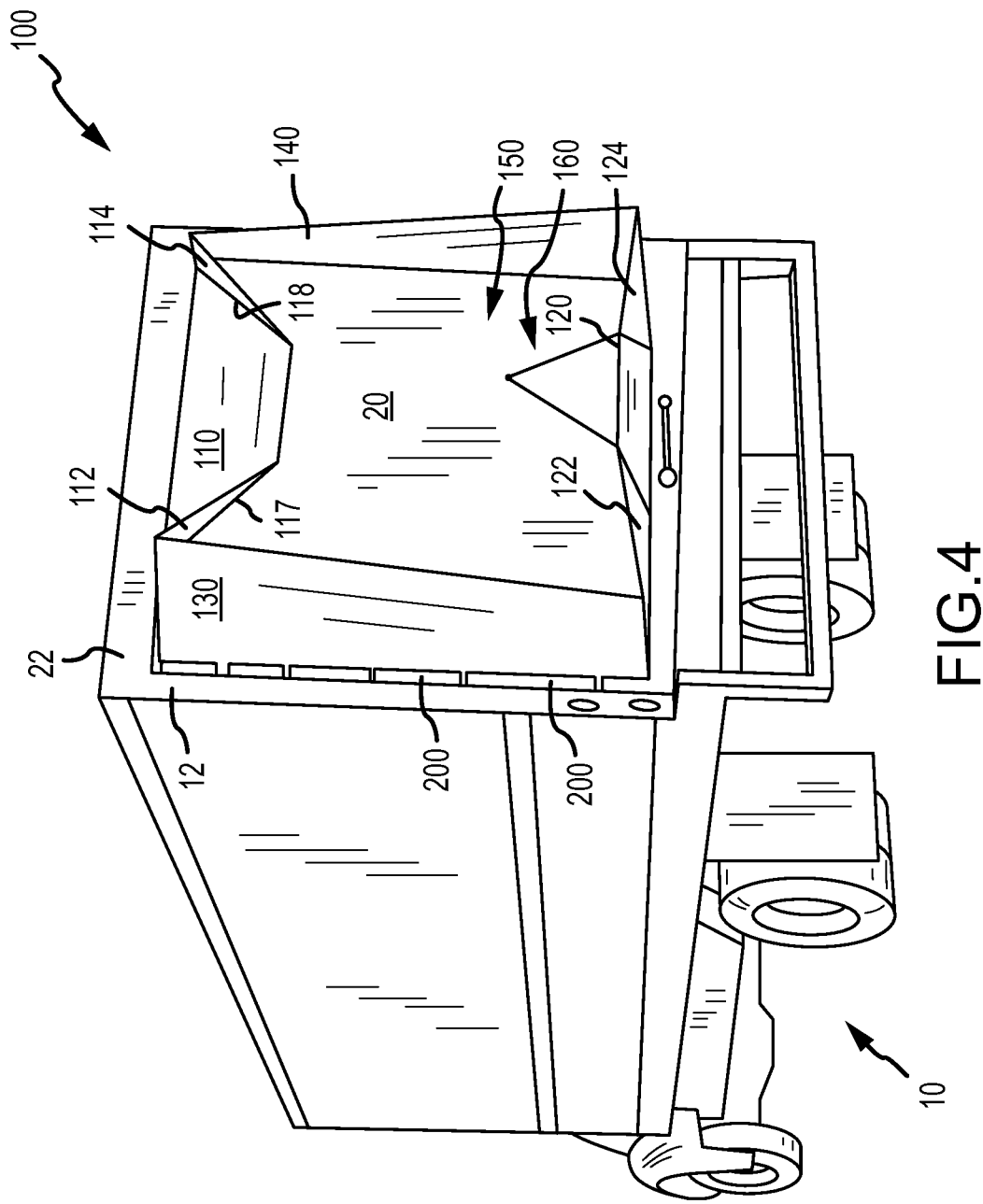
FIG. 4 is an illustration of the apparatus in FIG. 3 shown in an alternate partially unfolded configuration at an intermediate stage of deployment.
Figure 5:
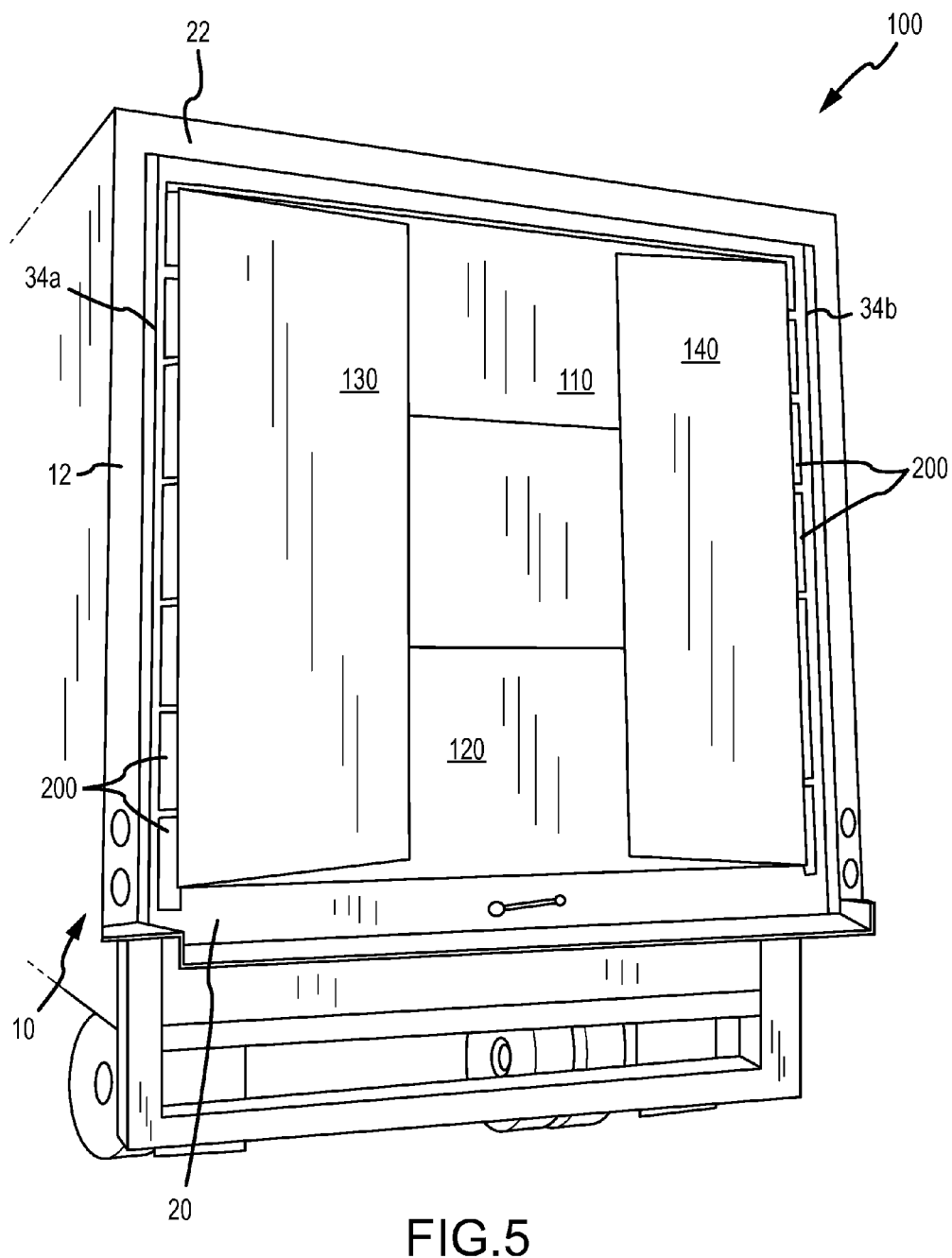
FIG. 5 is an illustration of the apparatus in FIG. 3 shown in a folded configuration with the cargo door in a closed position.

FIGS. 3-8 show illustrations of an assembly according to the present disclosure. The assembly includes an apparatus for drag reduction 100 attached to a cargo door 20 of a truck 10. The apparatus 100 shown in FIG. 3 is depicted in a partially unfolded configuration (e.g., during an early stage of deployment). In FIG. 4, the apparatus 100 is depicted in an alternate partially unfolded configuration (e.g., during another or intermediate stage of deployment). FIGS. 5, 6, and 8 depict examples of the apparatus 100 in a folded configuration (e.g., prior to deployment) at various stages of accessing the cargo compartment.

The apparatuses according to the present disclosure may be configured to be self-deploying, which implies that the panels automatically unfold when a speed of the land vehicle reaches or exceeds a threshold speed high enough to generate a low pressure region around the vehicle (e.g., in the wake of the vehicle). The pressure around the vehicle may decrease as the speed of the vehicle increases resulting in high/low pressure regions, with the high pressure region located immediately behind the vehicle and the low pressure regions located around and/or in the wake of the vehicle. Thus, as the vehicle speed increases, a suction or outward/lifting force may be produced around and/or in the vehicle's wake, which may cause the panels of apparatus 100 to automatically deploy or unfold to form the cavity 150 (see FIGS. 3 and 4). As the speed of vehicle 10 increases, the outer most panels (e.g., panels 130 and 140 in the example in FIG. 3) may be pulled outward due to the low pressure region around the vehicle and as these panel unfold, the remaining panels 110 and 120 may be pulled outward in part by the pressure differential and further assisted by the foldable attachment of the panels (e.g., by virtue of the transition panels connecting the main panels). The panels may remain in their unfolded or partially unfolded configuration as long as a low pressure region remains at the back of the vehicle. The panels may return to the folded configuration when the speed of the vehicle is below the threshold speed. One or more of the panels may return to their folded position due, in part, to gravity. For example, when the speed of the truck is insufficient to maintain the cavity in its expanded shape, gravity may act on the top panel pulling it down and thereby causing the side panels to fold inwards. In some examples, the panels may be manually expanded or folded back by the vehicle operator prior to departure and after reaching its destination. In some examples, the sizes, weights, composition and folding configuration of the panels may be further tailored to facilitate lower resistance in opening and folding of the drag reducing apparatus. For example, different folding configurations, e.g., as will be described with reference to FIG. 12, may be used which may offer additional advantages.

As noted, apparatuses according to the present disclosure may be affixed to the back end of a land vehicle (e.g., truck, or trailer) in a manner such that the apparatus 100 does not interfere with operation of the cargo door 20. In some examples, the apparatus 100 may be attached to an external face of a roll-up cargo door 20 of truck 10 without blocking access to the cargo door, for example as shown in FIGS. 3-6. For example, the apparatus 100 may be sized and/or attached to the cargo door such that the apparatus does not interfere with access to and operation of the handle of the cargo door. The apparatus may further be sized and/or positioned so as not to obstruct or interfere with other components of the cargo door (e.g. roll-up bar assembly 30) as may be needed for proper operation of the cargo door. The apparatus may be sized to fit substantially within the frame 12 around the cargo door. As will be appreciated, a typical roll-up door 20 may include a plurality of door panels 20a-20e hinged together and configured to roll along a system of tracks guided by rollers (see FIG. 10A). The individual articulating door panels 20a-e may typically be joined using a dovetail joint 24 (see e.g., FIGS. 6, 7) at the interface between the panels. The door panels 20a-e may pivot or articulate at the dovetail joint 24 as the door 20 is rolled up or down, with individual door panels separating on one side (e.g., the exterior side) at the joint. The individual door panels are stowed near the roofline of the cargo compartment, as the door is rolled up. A roll-up bar assembly 30 may assist the operation of the door (e.g., retracting of the panels of the door into the cargo compartment). The roll-up bar assembly 30 may include a roll-up bar 38 attached at the header 22 of the frame and a pair of suspension cables 34 which may extend from the roll-up bar 38 and are secured to the bottom panel 20a of the door. The roll-up bar may be slightly narrower than the width of the cargo compartment opening and as such, the suspension cables 34 may extend along the vertical length of the door near the sides of the frame 12. The apparatus 100 may be attached directly to the cargo door (e.g., to the individual door panels 20a-d) between the cables 34 as shown in FIGS. 3 and 5. The length of each of the top and bottom panels 110, 120 may be less than the distance between the cables 34. The length of each of the side panels 130, 140 along the vertical direction may be less than the distance between the floor of the cargo compartment and the header 22. As will be appreciated, when attached to the back door, the apparatus 100 may have a perimeter which may be smaller than the opening of the cargo compartment, such that the apparatus 100 may fit in the area defined by the frame 12 and self-deploy without interference with the frame 12, as shown in FIGS. 3 and 4.

Figure 12:
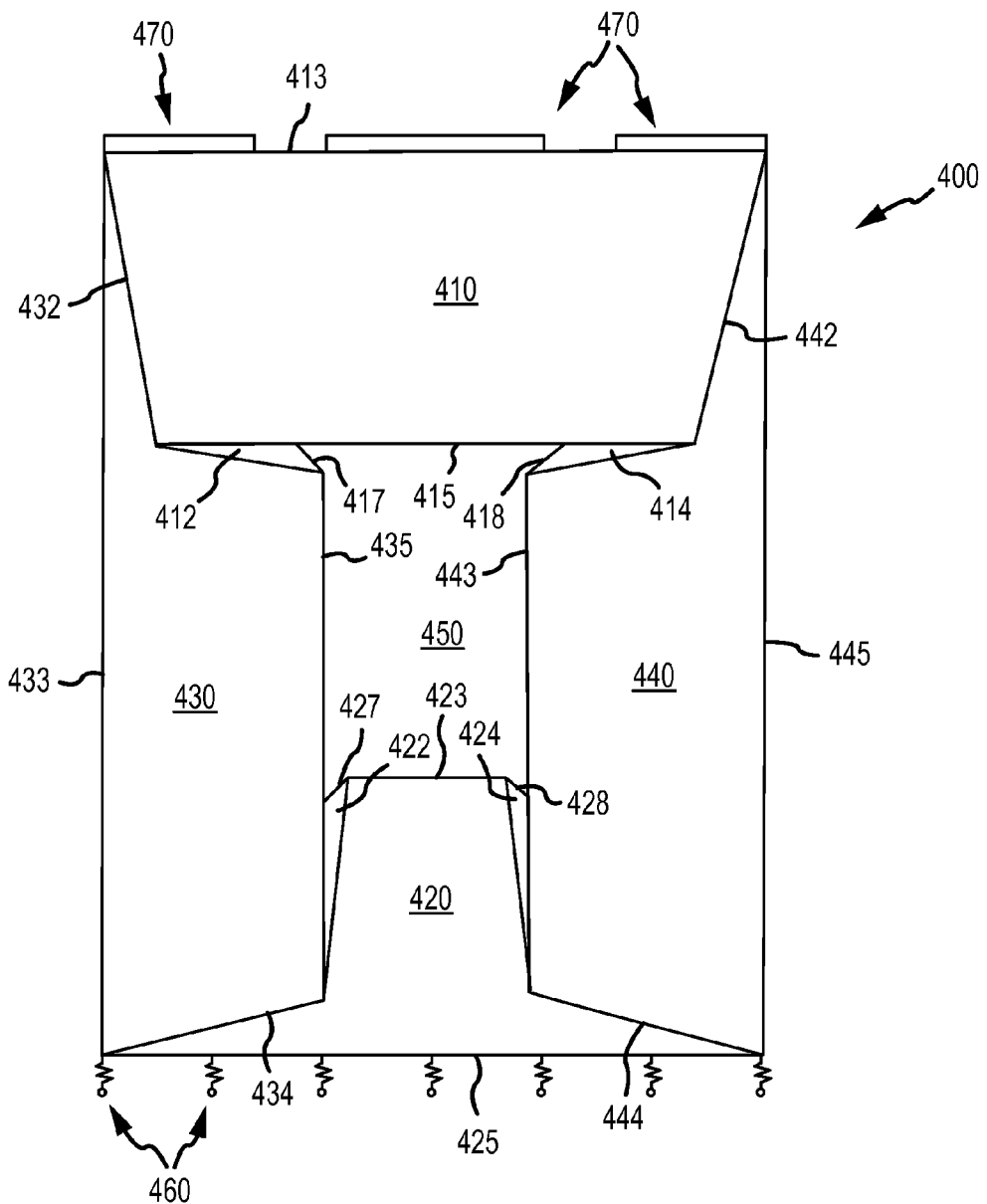
FIG. 12 is an apparatus according to another embodiment of the present disclosure.

In addition to being sized for unobstructedly mounting the apparatus 100 to the cargo door, the apparatus may further be slidably attached to the cargo door at least along certain edges of the apparatus in order to facilitate the effective expansion at each of the dovetail joints as the door panels articulate relative to one another. As described herein, the apparatus 100 may be attached to the cargo door along the vertical direction using slidable joints (e.g., attachment mechanisms 200). This may advantageously permit individual door panels 20a-e of the roll-up door 20 to pivot or articulate at the joints 24 without causing damage to the apparatus and/or damaging the coupling between the apparatus and the door. As may be appreciated, when the door 20 is articulated from closed to open position, the articulating joints 24 may essentially expand, thus requiring a larger surface area (along the vertical direction) to cover the surface of the door, as compared to when the joints 24 are in their non-articulated position. To achieve this, the second portion 220 (e.g., keder bead or keder bolt 222) of the attachment mechanism is free to slide relative to the first portion 210 (e.g., along the keder track 214) as the door panels articulate into the roof. The keder track 210 of each of the attachment mechanisms 200 may span a single panel (e.g., as shown in FIG. 7) while the keder bead may span across the dovetail joints 24 and may slide within the keder track 210 when the door panels (e.g., 20a, 20b, 20c) articulate at the joints 24. As such, the continuous semi-rigid panels (e.g., side panels 130, 140) may span a plurality of panels and slide relative to the panels when the door is retracted without damage to the panels. While in some examples, attachment mechanisms 200 are shown at each articulating door panel 20a-20e, it will be understood that the apparatus 100 may be attached along only a portion of the side edges if desired. That is, in some examples, fewer attachment mechanisms than depicted in the examples herein may be used. In some examples, the bottom edge of the apparatus (e.g., hinge line 125) may remain unattached to the door 20. The bottom edge may be allowed to "float" relative to the surface of the door. In other examples, the apparatus may be attached at one or a plurality of locations along the bottom edge, e.g., as shown in FIG. 12. The bottom edge may be attached using spring members 460 or other suitable retention mechanism which may allow the bottom edge to move relative to the roll-up door as may be required during opening and closing of the roll-up door.

During use, when a user (e.g., the truck operator) wishes to access the cargo compartment 48, the user may operate the handle of the cargo door, which remains unobstructed by the apparatus 100. The apparatus (e.g., apparatus 100) may remain attached in place and need not be moved out of the way to gain access to the handle and/or cargo compartment. Essentially no further manipulation of the drag reducing apparatus 100 may be required to access the handle and/or cargo compartment. This may advantageously provide significant time savings and simplicity of operation, especially for truck operators on tight schedules. After disengaging the latching mechanism of the roll-up door, the door may be moved upward in the direction of the arrow in FIGS. 6 and 8. As the door is rolled up and stowed below the roof of the truck, the apparatus which is attached thereto also becomes stowed in the cargo compartment. As described, the apparatus 100 is configured to lay generally conformally against the cargo door as the cargo door is articulated between the down or closed and up or stowed position (e.g. as shown in FIGS. 6, 8, and 10A). The panels of the apparatus may fold at the dovetail joints 24 as the panels articulates at the joints and the apparatus 100 may become stowed between the door and the roof. Other simplicity and/or time saving advantages may be achieved for example by virtue of the cross-over operation (e.g., as gap fill or tail drag reduction) as will be further discussed with reference to FIGS. 13-15.

Figure 9:
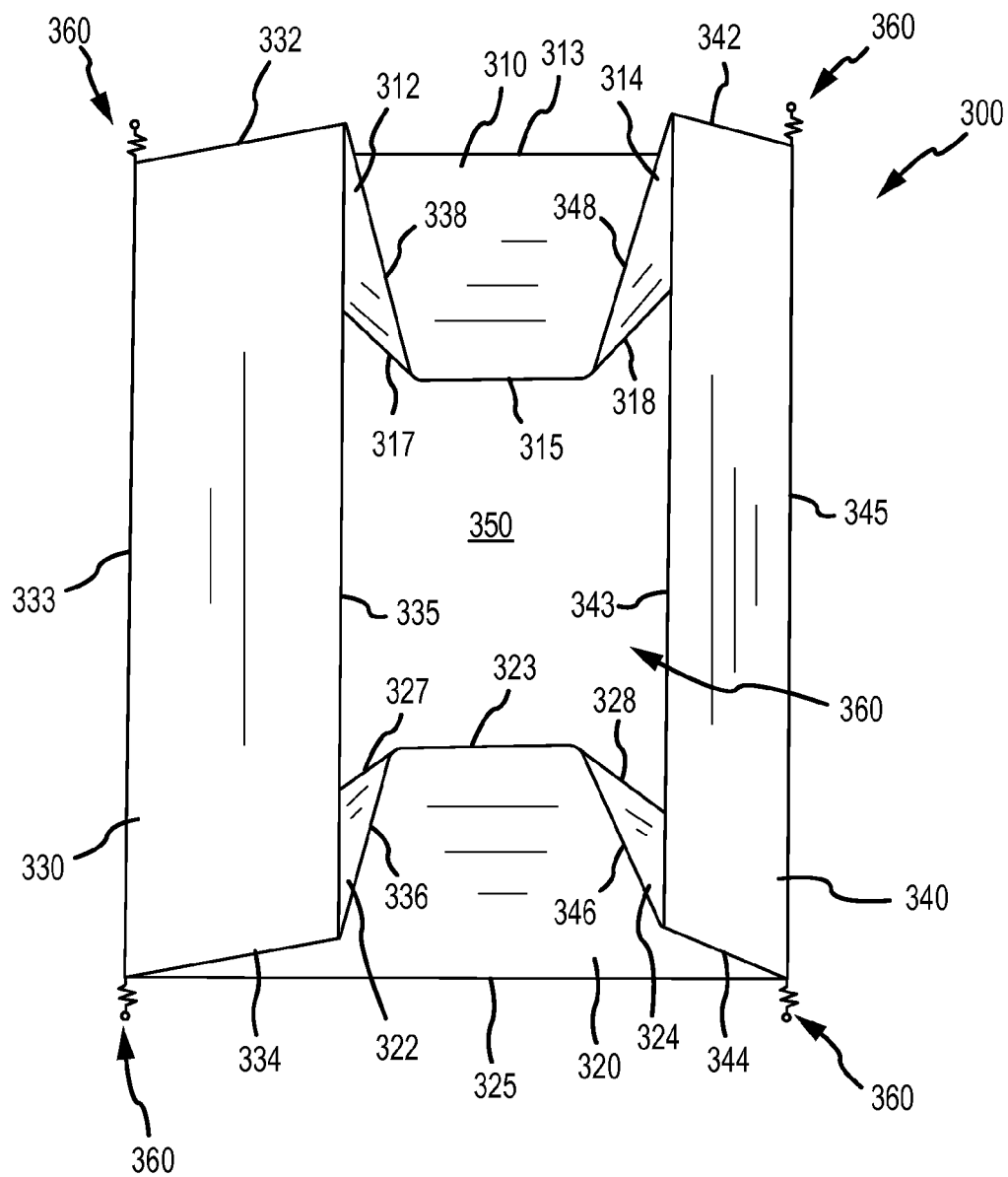
FIG. 9 is a front view of an apparatus for drag reduction according to another embodiment of the present disclosure.

FIG. 9 shows an apparatus according to another embodiment of the present disclosure. The apparatus 300 may include some or all of the features of the apparatus 100 as previously described. For example, the apparatus 300, includes a top panel 310, a bottom panel 320, a first side panel 330 (also referred to herein as left panel 330), and a second side panel 340 (also referred to herein as right panel 340). The apparatus may further include a back cover or back panel 350 which is foldably connected to the top, right, bottom and left panels (e.g., along the edges 313, 345, 325, and 333 of the top, right, bottom and left panels, respectively).

The apparatus 300 may include first and second top transition panels 312 and 314, respectively and first and second bottom transition panels 322 and 324, respectively. The first top transition panel 312 extends between the left panel 330 and the top panel 310 and the second top transition panel 314 extends between the top panel 310 and the right panel 340. The first bottom transition panel 322 extends between the left panel 330 and the bottom panel 320 and the second bottom transition panel 324 extends between the bottom panel 320 and the right panel 340. As will be understood the panels are connected such that they define a cavity 360 therebetween when the panels are provided in an unfolded configuration. Similar to the panels of the apparatus 100, the panels of apparatus 300 may be formed from a lightweight semi-rigid material, for example a polymer or composite material. For example, the main and transition panels of apparatus 300 may be formed using a fiber reinforced polypropylene or polyethylene (FRP) material. Any suitable material may be used, for example a material which is sufficiently rigid such that the panels maintain the shape of the cavity when deployed yet sufficiently flexible for the panels to conform to the door when the door is rolled up (e.g., as shown in FIG. 10A).

As described herein, the panels may be foldably coupled together to allow the panels to be provided between a first or folded configuration and a second or deployed configuration. The left panel 330 of apparatus 300 includes edges 332, 335, 334 and 333, the right panel 340 includes edges 342, 345, 344, and 343, the top panel 310 includes edges 313, 318, 315, and 317, and the bottom panel 320 includes edges 323, 328, 325, and 327. A foldable joint may be disposed at each of the fold lines between adjacent panels of the apparatus 300. In the folded configuration (e.g., see FIG. 10A), the panels lie substantially flat against each other and against the door 20 of and the vehicle 10. In a deployed or partially deployed configuration the panels fold away from the cargo door 20 to form the cavity 460 therebetween. The apparatus 300 may be configured for unobstructed use of the cargo door 20 as described herein. The apparatus 300 may further include one or more attachment mechanisms (e.g., 360) for securing the apparatus 300 to the land vehicle. The attachment mechanisms (e.g. spring lock 360) may be disposed at each corner of the apparatus to maintain the apparatus in taut engagement with the cargo door 20. The attachment mechanism (e.g., spring lock 360) may be configured to apply nominal tension to keep the apparatus in place during use.

As will be appreciated, in some examples, the apparatus may include a full back panel (e.g., back panel 350) which may facilitate ease of installation of the apparatus on the cargo door. The apparatus 300 may be hung from the top edge down and may be secured at the top and/or bottom (e.g., at the corners) via spring-loaded attachment mechanisms (e.g., spring lock 360 or other suitable tension mechanisms). In such examples, slidable attachment at the side edges may not be needed as the tension applied by the spring locks may be sufficient to maintain the apparatus in a secure and taut engagement with the cargo door. In further examples, the top edge of the apparatus 300 may be fixedly attached to the door, while the bottom edge is springedly attached to allow a certain amount of movement of the bottom edge relative to the door.

Other folding patterns for the panels of the apparatus may be used, for example as shown in FIG. 12. In the example in FIG. 12, the apparatus 400 includes a plurality of panels, also referred to as main panels, and transition panels similar to the panels of the apparatuses 100 and 300. The apparatus 400 may include a top panel 410, a bottom panel 420, first side panel 430 (also referred to as left panel 430) and second side panel 440 (also referred to as right panel 440). The apparatus 400 may include any of the features of the apparatuses (e.g., 100, 300) according to any of the embodiments described herein.

Each of the main panels (e.g., 410, 420, 430, and 440) of the apparatus 400 may be foldably coupled to two adjacent transition panels which bridge the gap between the main panels. The main panels and transition panels may be foldably or pivotally connected at their respective edges. The top panel 410 may be foldably connected to transition panels 412 and 414 at first and second side fold lines 432 and 442, respectively. The left panel and right panels 430 and 440 may be foldably coupled to the transition panels 412 and 414, respectively, at first and second top diagonal fold lines 417 and 418, respectively. The left panel and right panels 430 and 440 may be foldably coupled to the transition panels 422 and 424, respectively, at first and second bottom fold lines 427 and 428, respectively. The bottom panel 420 may be foldably connected to transition panels 422 and 424 at first and second bottom diagonal fold lines 427 and 428. As will be appreciated the example in FIG. 12 illustrates a combination in which one of the horizontally arranged panels (e.g., the top panel 410) is arranged as an over panel when folded, while the other one of the horizontally arranged panels (e.g., the bottom panel 420) is arranged as an under panel when folded. The side panels 430 and 440 are partially under and partially over other ones of the main panels. Such an arrangement may take advantage of the pressure profile while minimizing risk of damage due to overextension due to gravity. For example, in the arrangement in which the top panel 410 is an over panel, the top panel 410 may self-deploy with minimal resistance from the other panels to which it may be connected. For example, because no other panels are disposed over the top panel 410, the top panel 410 may be more easily pulled or lifted upward by the suction force (e.g., low pressure distribution) which may develop above the vehicle in certain conditions. On the other hand, the bottom panel 420 may naturally tend towards and unfolded position and/or downward due to gravity. As such, by arranging the bottom panel 420 as an under panel, this downward tendency may be reduced by the resistance to unfolding that may be caused by the other panels folded over the bottom panel (e.g. panels 430, 440 and transition panels 422 and 424). As described any of a variety of folding patterns may be used. In some examples, and depending on the desired configuration, different shapes and fold lines may be used to effectuate different expanded configurations, for example configurations resulting in a more conical structure or various non-symmetric structures.

Figure 10B:
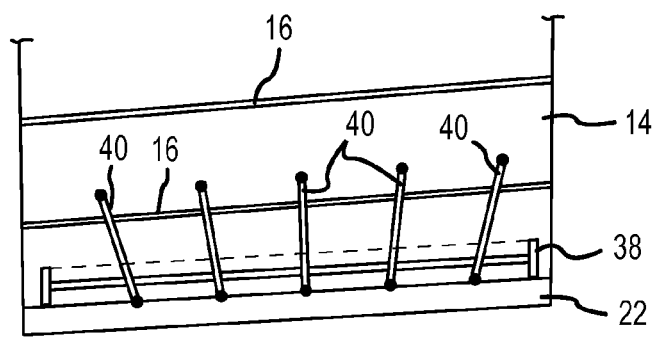
Figure 11:
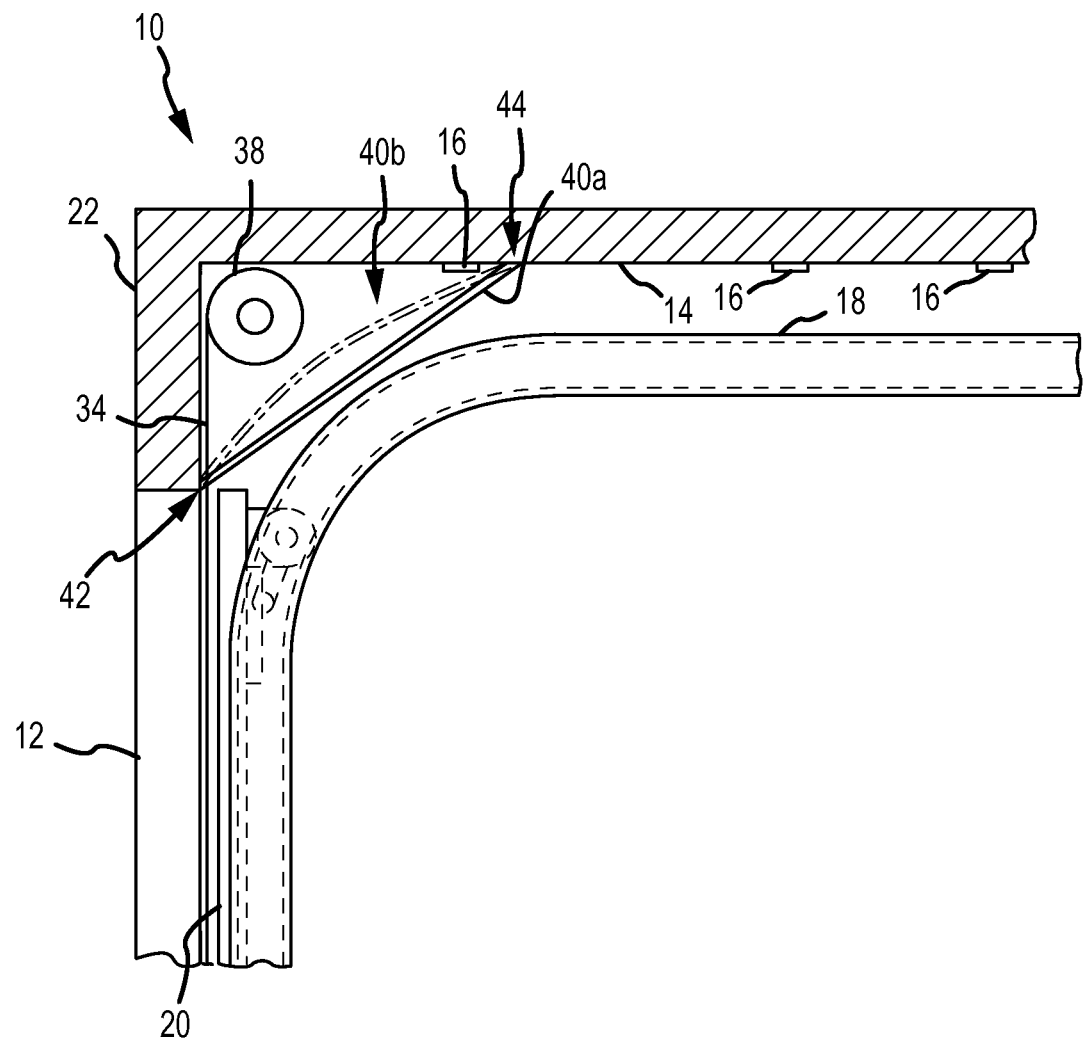
FIG. 11 is a side partial view of an assembly according to the present disclosure.

Referring back to FIGS. 10 and 11, an assembly according to the present examples may further include one or more span guides 40, which may be configured to guide the apparatus 300 in the space between the roll-up door 20 and the roof 14. The span guide 40 may be a longitudinal member 40, which extends between the header 22 and the roof line 14. The span guide 40 may be attached to the roof line behind one, two, or more of the ribs 16 in the roof line 14 (e.g., as shown in FIG. 11). A first end 42 of the span guide may be attached to the header 22 and a second end 44 of the span guide may be attached to the roof 14, e.g., behind a roof rib 16. In some examples, the one or more span guides 40 may be attached to the header (e.g., at a lower portion of the heater) and may pass under and forward of any number of ribs as may be desired or appropriate to prevent or minimize the risk of the apparatus becoming caught or hooked on any of the ribs. The span guide may attach to the roof line ahead of one or more ribs creating a smooth path flush with the roof.

In some examples, the span guide may be a flexible or rigid member. The span guide may be made from plastic, metal, or a composite material. The span guide may be made from fiber reinforced plastic material similar to or the same as the semi-rigid panels of the apparatus. The span guide 40 may include a plurality of members (see FIG. 10B) arranged along the width of the roof 14. More or fewer span guide members than the example shown may be used. In some examples, the span guide 40 may be a continuous sheet (e.g., made from FRP) which may extend substantially along the width between the ends of the roll-up bar 38. As will be appreciated, the span guide 40 may be configured to prevent or minimize the risk that the drag reducing apparatus may become damaged during opening and closing of the roll-up door. As described, in some instances, the apparatus (e.g., apparatus 300) may be attached to the cargo door only at the four corners leaving the top edge 313 free. As the roll-up door 20 is moved from the down to the up position, the individual panels e.g., 20a, 20b, 20c, may move along the track 18 and each panel may articulate at the joint 24. Each rigid panel 20a, 20b, etc. may initially be angled towards the roof line 16 before becoming generally parallel to the roof in the stowed position. Thus, the top edge 313 of the apparatus which is attached to the top most panel of the roll-up door may initially angle towards the roof 14 and/or ribs 16 and may risk becoming stuck behind one of the ribs 16 as the door is rolled-up. The span guide 40 may essentially urge the top edge 313 of the apparatus away towards the door and away from the roofline and/or ribs. As described, the span guide may be a rigid member and in such examples, it may be a preformed (e.g., curved member 40b) which provide sufficient clearance for the edges of the panels to clear move through the space below the roof line. In other examples, the span guide may be a flexible member 40a, which may be generally straight when installed between the header and roof line and/or which may curve/flex as the door and apparatus attached thereto come into contact with the span guide 40a.

Figure 13:
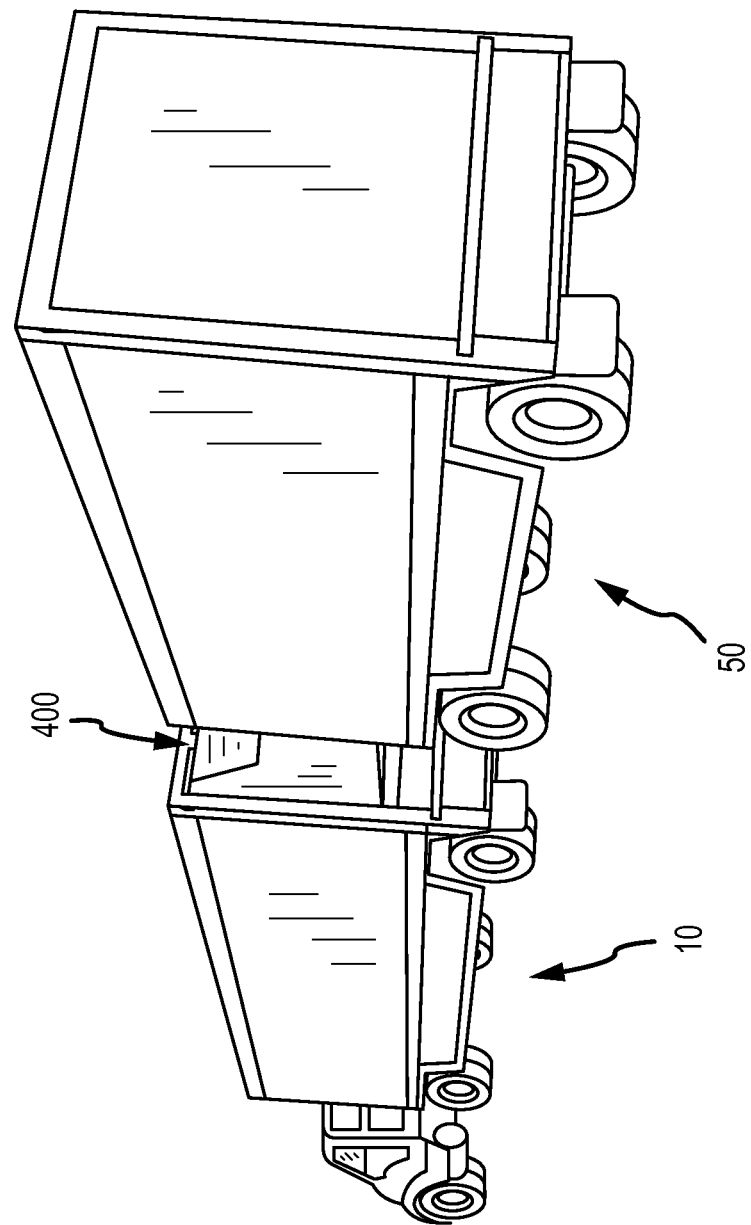
FIG. 13-15 are illustrations of an apparatus according to the present disclosure attached to a land vehicle in a gap fill configuration.
Figure 14:
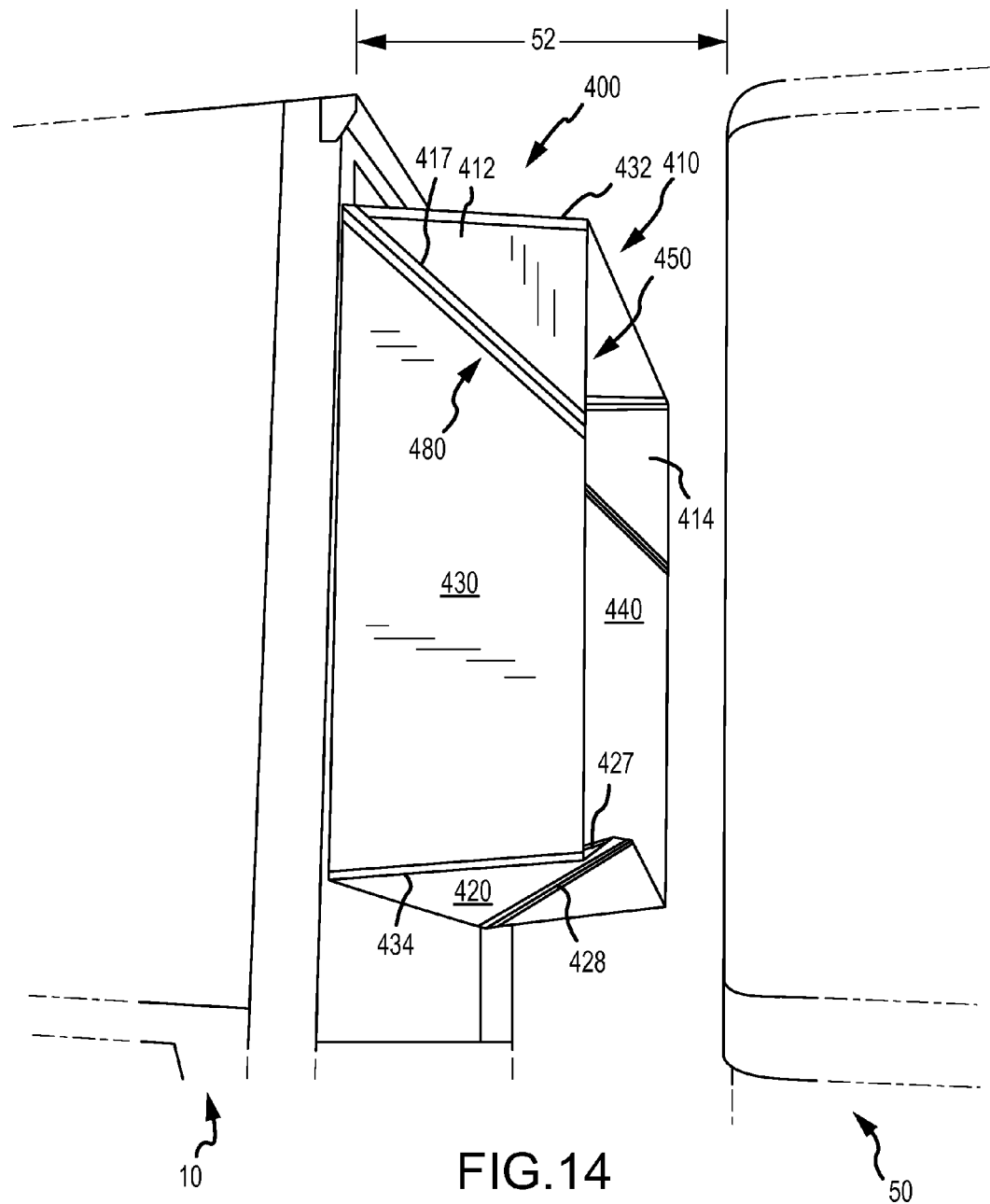
Figure 15:
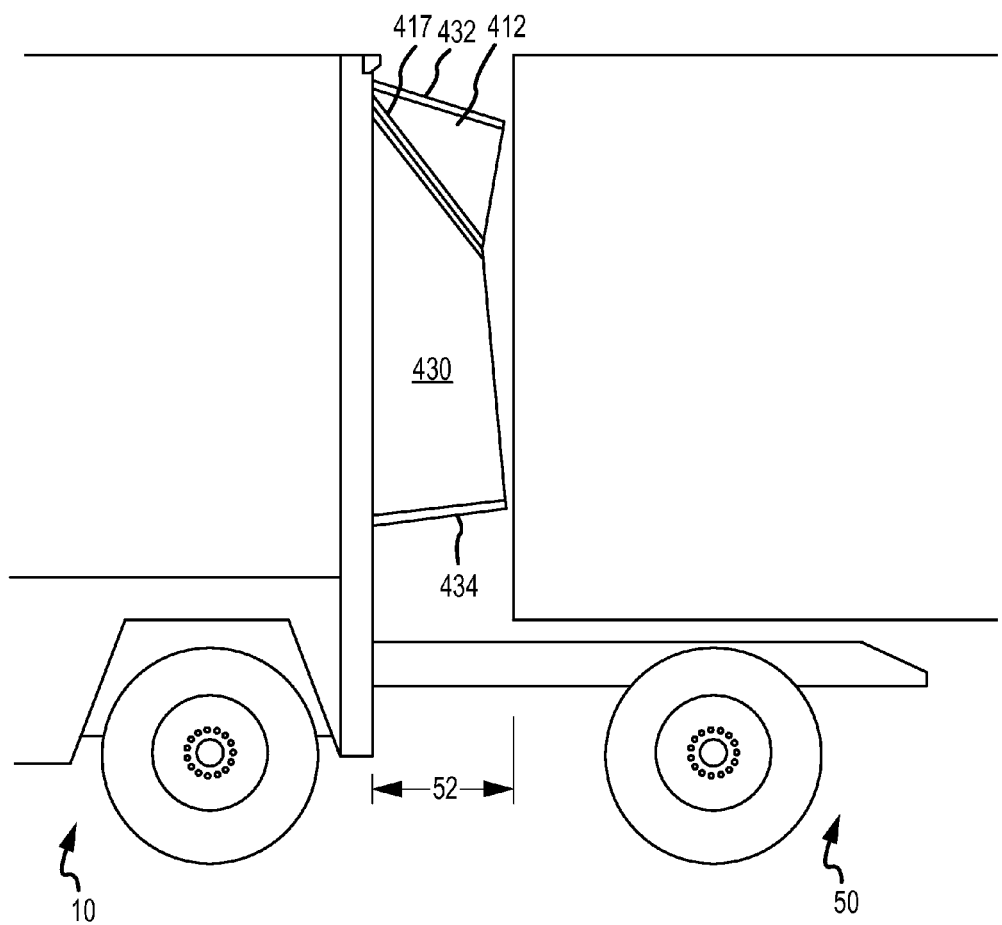

In some examples, the drag reduction apparatus may be a dual-purpose apparatus. The apparatus may be used for drag reduction at the tail end and it may further be used as a gap-filler when multiple land vehicles (e.g. tractor unit, trailers, semi-trailers) are arranged together such that they to move together (e.g. in a "road train" configuration). In such examples, two or more cargo vehicles (e.g., trailers, semi-trailers) may be pulled using the same tractor unit, for example for achieving certain transport efficiencies. In such examples, apparatuses for drag reduction as described herein may also be included between each trailer, for example as shown in FIGS. 13-15. An apparatus for drag reduction 400 may be mounted at the rear of each preceding land vehicle (e.g., attached to a cargo door of the preceding trailer 10), which apparatus 400 may then function in a similar manner as described herein. The apparatus 400 may be sized so that it is sufficiently large to fill the space or gap 52 between adjacent vehicles of the vehicle train (e.g., 10, 50), but small enough so that the panels (e.g., 410, 420, 430, 440) when expanded do not contact the next vehicle 50 in the vehicle train. As described, a pressure profile around the vehicle 10 may facilitate expansion or self-deployment of the apparatus 400 as the vehicle train is travelling at or above certain speed. In some examples, the apparatus 400 may fold or deflate (e.g., return to the undeployed configuration) when the vehicle(s) speed reduces below a threshold speed. In other examples, the gap 52 may decrease at certain times (e.g., when the vehicle train is breaking/stopping, or turning which may cause at least one side of the following vehicle in the train to come closer to the preceding vehicle, see FIG. 15). In such examples, the reduction of the gap 52 may assist the folding of the apparatus (e.g., to return the apparatus in the undelployed or a partially deployed configuration). As will be understood, apparatuses according to the present disclosure may be mounted to the back of each of the land vehicles, including the last vehicle in the train for drag reduction at the rear of the road train. In some examples, a drag reduction apparatus may be provided at intermediate locations along the length of the road train (e.g., at each or some of the gaps between the vehicles in the train). A further advantage of the drag reduction apparatuses may be the unobstructed manner in which the apparatuses are mounted to the land vehicles. As described, because the apparatus does not interfere with access to the cargo door, the apparatus may remain attached to the door at all times without impacting efficiency of accessing the cargo. Arrangements as described herein may offer the added advantage of obviating the need for moving the drag reduction device from one trailer to the next, particularly when the trailers are used interchangeably in a double- or triple-trailer configuration in which the trailers may be switched fore and aft.

FIG. 16 is an illustration of a foldable joint 480 (also referred to herein as living hinge) according to the present disclosure. As described, a foldable joint according to any of the examples herein can be disposed along any of the adjacent edges of the panels, e.g., 417, and 432 as shown in FIG. 14. Living hinges according to other examples may be implemented using like or dissimilar materials which may be welded, chemically bonded or mechanically fastened to adjacent peripheral panel portions. In some examples, living hinges may be implemented using mechanically fixed dual durometer extrusions. Furthermore, in some examples, improved aerodynamic shape of the apparatus may be maintained using over-center hinge panel locations for 45° fold-to-flat/open positions which may restrict hyper-extension of the panels.

The foldable joint 480 may include a first or top layer 488 and a second or bottom layer 489. The top and bottom layers 488, 489 may be formed from a flexible material. By flexible material in the context of the foldable joint, it is implied that the material is bendable about an in plane axis of the joint 480. For example, the top and/or bottom layers 488, 489 may be formed from a resilient plastic material such as PVC or drip irrigation tubing. Fabric, tarp, rubber, or virtually any other bendable materials may be used. The material may be sufficiently durable to withstand high cyclical loads (e.g., folding and unfolding of the joint). The top and bottom layers 488, 489 may be disposed along first and second peripheral portions 482, 484 of two adjacent panels. The top and bottom layers 488, 489 may each be disposed on opposite sides of the peripheral portions and may straddle the gap or cavity 485 between the peripheral portions. The gap may me nearly zero in some examples, while in other examples (e.g., if the panels are thicker), a slightly larger gap 485 may remain to facilitate free articulation of the panel portions. The top and bottom layers 488, 489 may be secured to each of the peripheral portions using any conventional means, for example by fusing or bonding the top and bottom layer to abutting surfaces of the panel portions, or by stitching, or by fastening the layers to the panel portions using mechanical fasteners 483 (e.g., pins, rivets, and the like). In further examples, the top and/or bottom layers may be attached to the peripheral portions of the panels using heat or ultrasonic welding, which may be continuous or discontinuous along the length of the foldable joint. In some examples, the foldable joint 480 may be configured to preferentially fold in a given direction. For example, foldable joints along the fold lines 332, 342, 334, and/or 344 of the apparatus 300 may be configured to urge the transition panels to fold towards the side panels 330 and 340, while the foldable joints along the fold lines 317, 318, 327, and/or 328 may be configured to fold in the opposite direction. This may be achieved by using dissimilar materials for the top and bottom layers of the foldable joint and or preforming the layers (e.g., in a slightly curved shape) to cause a natural tendency or direction of the fold.

As described numerous advantages may be obtained by apparatuses according to the present disclosure. One such advantage is the ease of access to the cargo door and cargo portion of the vehicle despite the presence of the drag reduction apparatus. The apparatus allows for unobstructed operation of the cargo door, with the apparatus conveniently stowing away in the cargo bay when the door is in an open position. The keder type attachment described provides for free articulation of the roll-up door. As described, the bottom floating edge may advantageously allow the side keder ropes to slip through the rail as the door is opened thus providing the unobstructed articulation of the door and convenient stowage of the drag reducing device in the roof space. Other advantages may be obtained from various folding patterns of the panels. In the example depicted in FIGS. 1-9, the side panels are shown to overlie the top and bottom panels. Such a folding arrangement may be advantageous for providing a faster and/or more responsive self-expansion of the device. This folding arrangement may be further advantageous when it comes to actuation of the door (e.g. rolling the door up and down). Having the outermost panel being the panel whose free edge runs vertical may allow for the folded device to roll easily into the roof space without risking of any edges, particularly the bottom edge catching at the edge of the door opening. Other folding arrangements, for example as described with reference to FIGS. 12-15 may be used, which may offer advantages as described herein and as will be further appreciated in light of the present disclosure. In further examples, while not necessary additional mechanisms, for example buckles, straps, snaps, or other fastening mechanisms, may be provided on the panels for securing the panels in a folded position as the operator manipulated the door.

While various aspects and examples have been disclosed herein, other aspects and examples will be apparent to those skilled in the art. The various aspects and examples disclosed herein are for purposes of illustration and are not intended to be limiting. Thus, the present disclosure is not intended to be limited to the embodiments shown herein but is to be accorded the widest scope possible consistent with the principles and novel features as defined by the following claims.

The invention claimed is:

1. An apparatus for drag reduction, the apparatus comprising:
a plurality of panels including a top panel, a bottom panel, a first and second side panels, and a plurality of transition panels connecting the top, bottom and side panels, the plurality of panels foldably coupled to allow the panels to be folded to a folded configuration in which the panels are substantially flat against each other and unfolded to a deployed configuration in which the panels define a cavity therebetween, wherein each of the panels from the plurality of panels is made from a semi-rigid material; and
an attachment mechanism disposed along a side edge of the first side panel or the second side panel and configured to pivotally and slidably secure the first side panel or the second side panel to a roll-up door of a vehicle, wherein the attachment mechanism comprises a first portion configured to be fixedly attached to an individual door panel of the roll-up door, wherein the attachment mechanism further comprises a second portion attached to the first side panel or the second side panel, and wherein the second portion is slidably coupled to the first portion.

2. The apparatus of claim 1, wherein the attachment mechanism is a keder-type device including a keder bead attached to one of the first or second side panels, the keder-type device further including a keder rail configured for attachment to a roll-up door of a truck.

3. The apparatus of claim 2, wherein the attachment mechanism is one of a plurality of attachment mechanisms disposed along a first edge of the first side panel and along a second edge of the second side panel.

4. The apparatus of claim 1 further comprising a foldable joint disposed at adjacent edges of one or more of the plurality of panels, the foldable joint comprising a multi-layer structure secured to either or both sides of the panels such that a gap remains between layers of the multi-layer structure.

5. The apparatus of claim 4, wherein at least one layer of the multi-layer structure is made from a flexible material.

6. The apparatus of claim 1 further comprising a back cover and wherein the top panel, the bottom panel, and the first and second side panels are each foldably attached to the back cover.

7. The apparatus of claim 6, wherein the top and bottom panels are disposed between the side panels and the back cover when the panels are in the folded configuration.

8. The apparatus of claim 4, wherein at least one layer of the multi-layer structure is made from rubber, fabric, or tarp.

9. The apparatus of claim 1, wherein the top panel is a continuous panel having a top edge which extends from the first side panel to the second side panel, and wherein the apparatus is bendable, when the panels are in the folded configuration and attached to the vehicle door, about an axis parallel to the top edge of the top panel.

10. The apparatus of claim 1, wherein at least two adjacent panels of the plurality of panels are joined to one another using a foldable joint.

11. The apparatus of claim 10, wherein the foldable joint comprises a living hinge.

12. The apparatus of claim 11, wherein the living hinge comprises a dual durometer extrusion.

13. The apparatus of claim 10, wherein the foldable joint comprises top and bottom layers made from flexible material.

14. The apparatus of claim 13, wherein the top layer is attached to a first surface of each of the adjacent panels and the bottom layer is attached to a second opposite surface of each of the adjacent panels.

* * * * *